US008935137B1

(12) United States Patent
Han et al.

(10) Patent No.: US 8,935,137 B1
(45) Date of Patent: Jan. 13, 2015

(54) GRAPHIC THEORETIC LINEARIZATION OF SENSITIVITY ANALYSIS

(75) Inventors: Zhi Han, Acton, MA (US); Fu Zhang, Sherborn, MA (US); Murali K. Yeddanapudi, Lexington, MA (US); Pieter Johannes Mosterman, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 288 days.

(21) Appl. No.: 13/291,907

(22) Filed: Nov. 8, 2011

(51) Int. Cl.
*G06G 7/48* (2006.01)

(52) U.S. Cl.
USPC .......................................................... 703/6

(58) Field of Classification Search
USPC ................. 703/2, 6, 11, 13; 706/12; 711/162; 718/100
See application file for complete search history.

(56) References Cited

U.S. PATENT DOCUMENTS

| | | | |
|---|---|---|---|
| 6,226,789 B1 | 5/2001 | Tye et al. | |
| 7,904,280 B2* | 3/2011 | Wood ................................ | 703/2 |
| 8,156,147 B1 | 4/2012 | Tocci et al. | |
| 2007/0043992 A1 | 2/2007 | Stevenson et al. | |
| 2007/0083347 A1* | 4/2007 | Bollobas et al. .................. | 703/2 |
| 2007/0157162 A1 | 7/2007 | Ciolfi | |
| 2008/0059739 A1* | 3/2008 | Ciolfi et al. .................... | 711/162 |
| 2009/0012754 A1* | 1/2009 | Mosterman et al. .............. | 703/2 |
| 2009/0228250 A1* | 9/2009 | Phillips ............................. | 703/2 |
| 2009/0235252 A1* | 9/2009 | Weber et al. ................... | 718/100 |
| 2010/0017179 A1* | 1/2010 | Wasynczuk et al. .............. | 703/6 |
| 2010/0057651 A1* | 3/2010 | Fung et al. ....................... | 706/12 |
| 2010/0228693 A1* | 9/2010 | Dawson et al. .................. | 706/12 |
| 2010/0262568 A1* | 10/2010 | Schwaighofer et al. ........ | 706/12 |
| 2011/0137632 A1* | 6/2011 | Paxson et al. .................... | 703/11 |
| 2012/0023477 A1 | 1/2012 | Stevenson et al. | |
| 2013/0116986 A1 | 5/2013 | Zhang et al. | |
| 2013/0116987 A1 | 5/2013 | Zhang et al. | |
| 2013/0116988 A1 | 5/2013 | Zhang et al. | |
| 2013/0116989 A1 | 5/2013 | Zhang et al. | |
| 2013/0198713 A1 | 8/2013 | Zhang et al. | |

OTHER PUBLICATIONS

Paliwal et al., "State space modeling of a series compensated long distance transmission system through graph theoretic approach", IEEE, 1978.*
International Search Report and Written Opinion dated Jan. 31, 2013 issued in corresponding PCT application No. PCT/I/US2012/063223, 9 pages.
Hiskens, Ian A. and Pai, M.A. "Trajectory Sensitivity Analysis of Hybrid Systems." IEEE Transactions on Circuits and Systems—Part I: Fundamental Theory and Applications, vol. 47, No. 2, Feb. 2000, pp. 204-220.
Hiskens, Ian A. and Pai, M.A. "Power System Applications of Trajectory Sensitivities." IEEE, 2002, pp. 1-6.
Nguyen, Tony B., Pai, M.A, and Hiskens, I.A. "Computation of Critical Values of Parameters in Power Systems Using Trajectory Sensitivities." 14th PSCC, Sevilla, Jun. 24, 2002, Session 39, Paper 5, pp. 1-6.
Donze, Alexandre and Maler, Oded. "Systematic Simulation using Sensitivity Analysis." Verimag, Gieres, France, pp. 1-16.

(Continued)

*Primary Examiner* — Kandasay Thangavelu
(74) *Attorney, Agent, or Firm* — Harrity & Harrity, LLP

(57) ABSTRACT

A first block may be received. The first block may represent part of at least a portion of a block diagram model. A Jacobian of the first block may be determined. The Jacobian of the first block may be stored as a first graph.

23 Claims, 21 Drawing Sheets

(56) References Cited

OTHER PUBLICATIONS

Masse, J. "Diffedge: Differentiation, sensitivity analysis and idenfication of hybrid Models." Appedge, Consulting & Engineering, pp. 1-9.
Serban, Radu and Hindmarsh, Alan C. "CVODES: An ODE Solver with Sensitivity Analysis Capabilities." ACM Transactions on Mathematical Software, vol. V, No. N, Sep. 2003, pp. 1-22.
Griewank, Andreas. "A mathematical view of automatic differentiation." Acta Numerica, 2003, pp. 1-78.
Griewank, Andreas and Reese, Shawn. "On the Calculation of Jacobian Matrices by the Markowitz Rule." Mar. 1992, pp. 1-14.
Henzinger, Thomas A. "The Theory of Hybrid Automata." pp. 1-30.
Zecevic, A.I. and Siljak, D.D. "Design of Robust Static Output Feedback for Large-Scale Systems." IEEE Transactions on Automatic Control, vol. 49, No. 11, Nov. 2004, pp. 1-5.
Peponides, George M. and Kokotovic, Petar V. "Weak Connections, Time Scales, and Aggregation of Nonlinear Systems." IEEE Transactions on Automatic Control, vol. AC-28, No. 6, Jun. 1983, pp. 729-735.
Siljak, D.D. "On Stability of Large-Scale Systems under Structural Perturbations." IEEE Transactions on Systems, Man, and Cybernetics, Jul. 1973, pp. 415-417.
Vidyasagar, M. "Decomposition Techniques for Large-Scale Systems with Nonadditive Interactions: Stability and Stabilizability." IEEE Transactions on Automatic Control, vol. AC-25, No. 4, Aug. 1980, pp. 773-779.
Bang Jensen et al., "Digraphs Theory, Algorithms and Applications", Aug. 2007, 772 pages.
Bauer, "Computational Graphs and Rounding Error", SIAM Journal on Numerical Analysis, vol. 11 No. 1, Mar. 1974, 10 pages.
Griewank, et al., "Evaluating Derivatives: Principles and Techniques of Algorithmic Differentiation", 2008, 458 pages.
Sezer et al., "Nested Epsilon Decompositions of Linear Systems: Weakly Coupled and Overlapping Blocks", Proceedings of the 1990 Bilkent Conference on New Trends in Communication, Control and Signal Processing, vol. 1, (1990), 13 pages.
Zecevic et al., "Control of Complex Systems —Decompositions of Large-Scale Systems", Chapter 1, Communications and Control Engineering, (2010) 27 pages.
Henzinger, "The Theory of Hybrid Automata", Proceedings of the 11$^{th}$ Symposium on Logic in Computer Science (LICS '96) 1996, 30 pages.
Zhou et al., "Essentials of Robust Control", Prentice-Hall, Inc., 1998, 411 pages.
Jamshidi et al., "Applications of Fuzzy Logic Towards High Machine Intelligence Quotient Systems", Environmental and Intelligent Manufacturing Systems Series, Prentice Hall PTR, 1997, 423 pages.
Šiljak, "Large-Scale Dynamic Systems—Stability and Structure", Dover Publications, Inc., 1978, 416 pages.
Frank, "Introduction to System Sensitivity Theory", Academic Press, Inc., 1978, 386 pages.
Šiljak, "Decentralized Control of Complex Systems", Dover Publications, Inc., 1991, 528 pages.
Ilić et al., "Dynamics and Control of Large Electric Power Systems", John Wiley & Sons, Inc., 2000, 838 pages.
Webster, "Wiley Encyclopedia of Electrical and Electronics Engineering—vol. 11", John Wiley & Sons, Inc., 1999, 763 pages.

\* cited by examiner

300

350

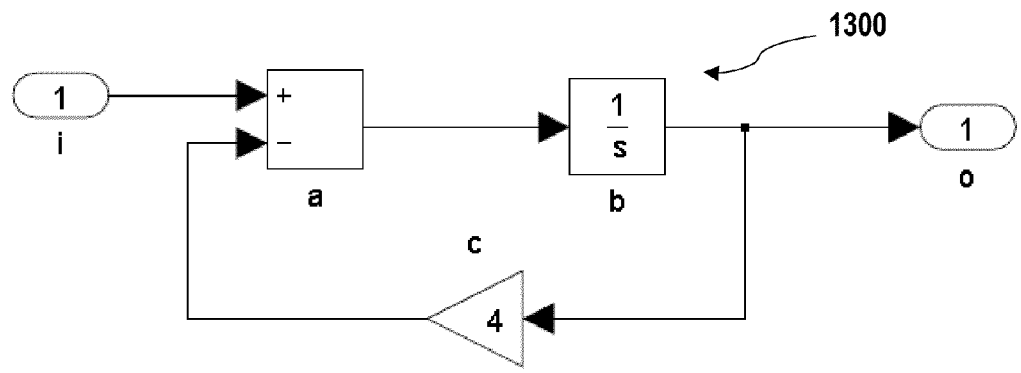
FIG. 13
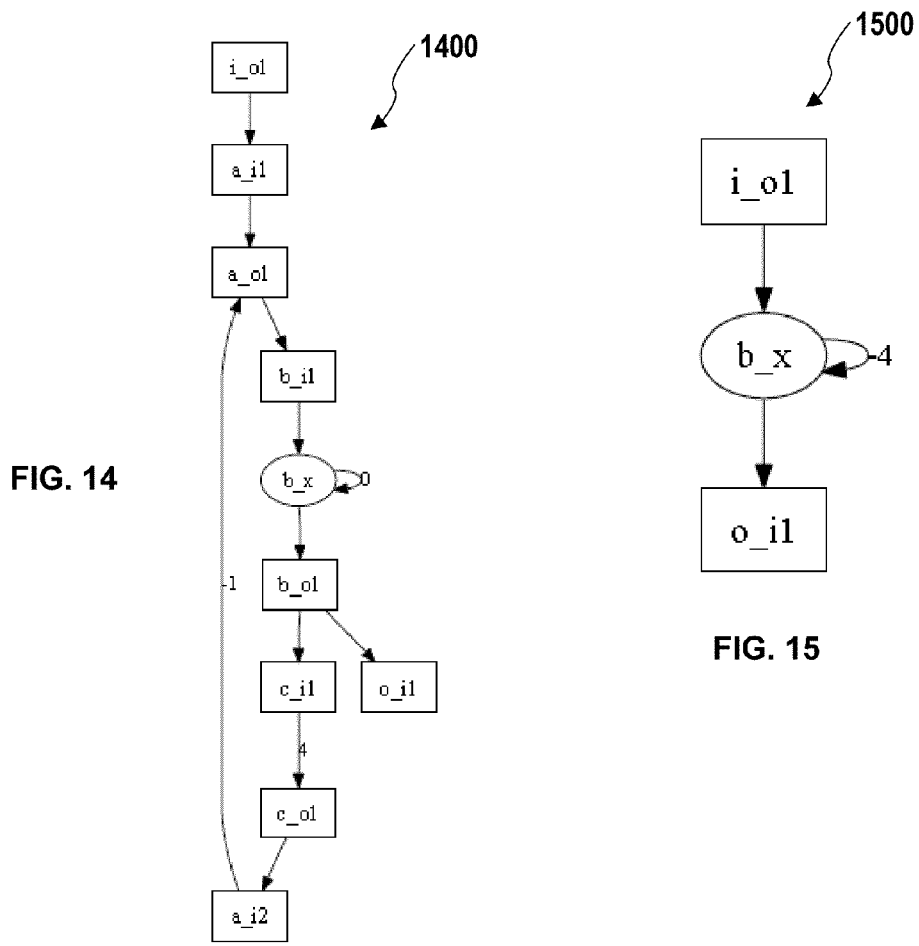
FIG. 14
FIG. 15

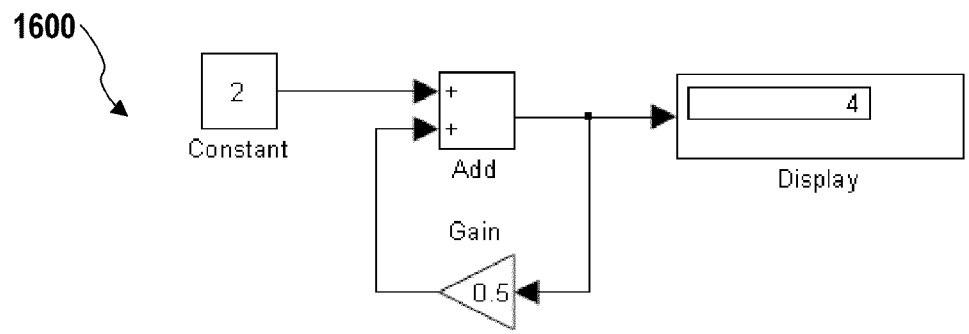
FIG. 16
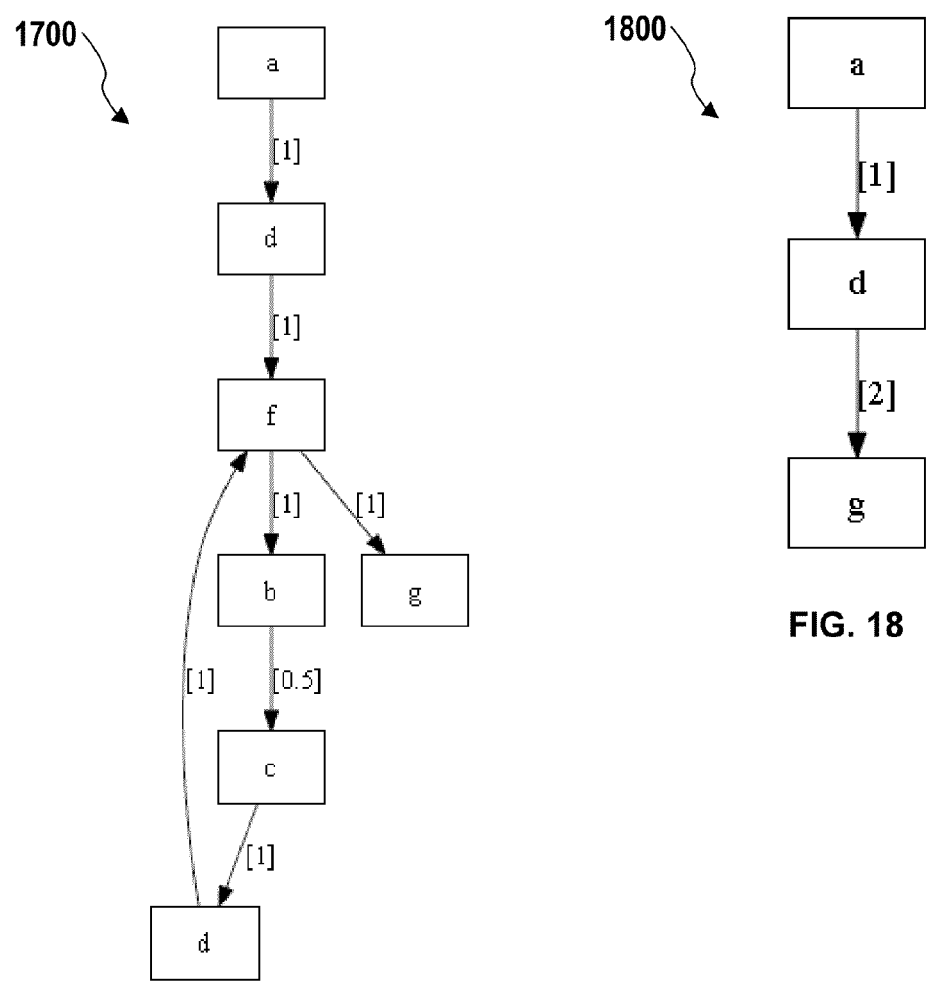
FIG. 17
FIG. 18

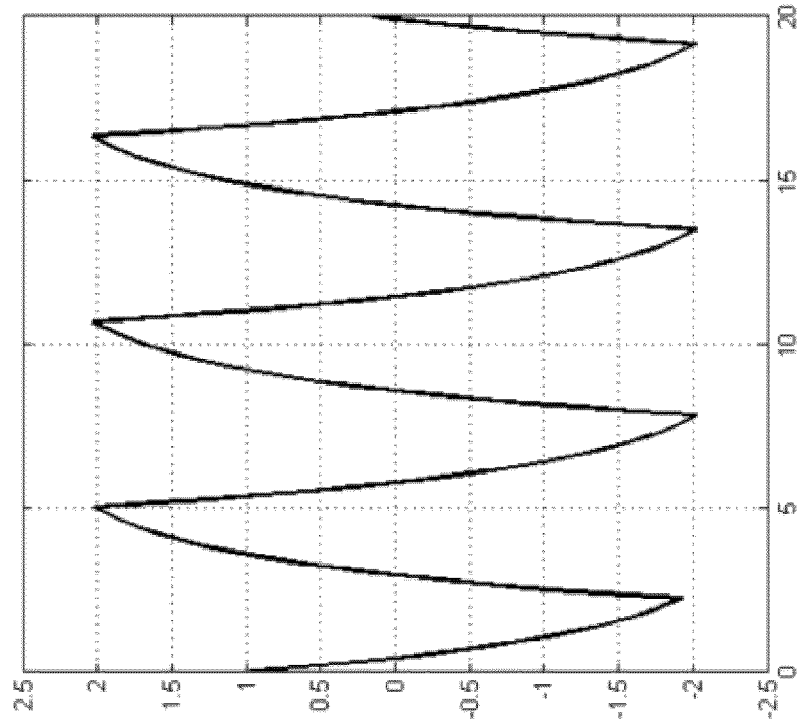
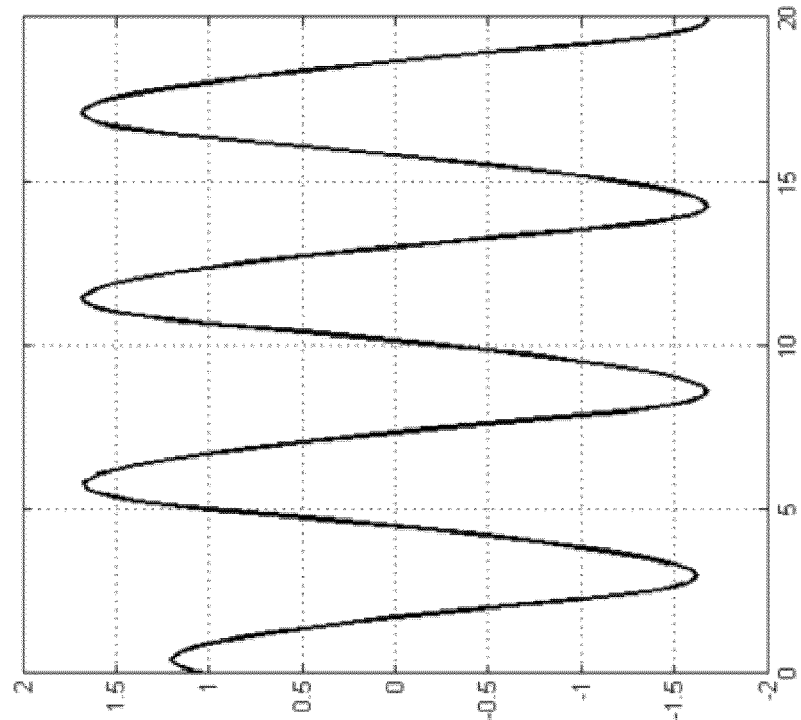
FIG. 26B
FIG. 26A

US 8,935,137 B1

GRAPHIC THEORETIC LINEARIZATION OF SENSITIVITY ANALYSIS

This patent application is related to the co-filed U.S. patent application Ser. No. 13/291,899 entitled "VISUALIZATION OF DATA DEPENDENCY IN GRAPHICAL MODELS," filed Nov. 8, 2011, which is hereby incorporated by reference in its entirety.

BACKGROUND SECTION

A variety of dynamic systems exist, including systems for communications, controls, signal processing, video processing, and image processing. As systems have become more complicated, the development and testing of these systems have also become more complicated. Accordingly, computational tools have been developed to help model, simulate, and analyze such systems.

In one approach to modeling, simulating and analyzing systems, computational tools may represent systems as graphical models. Systems may be graphically modeled by decomposing components of the system into individual blocks. These blocks may then be connected to one another to form a block diagram model representing a system.

BRIEF DESCRIPTION OF THE DRAWINGS

The accompanying drawings, which are incorporated in and constitute a part of this specification, illustrate one or more embodiments of the invention and, together with the description, explain one or more illustrative embodiments of the invention. In the drawings.

FIG. 13 illustrates another example block diagram model according to an illustrative embodiment;

FIG. 14 illustrates an example Jacobian graph of the block diagram model in FIG. 13 according to an illustrative embodiment;

FIG. 15 illustrates an example reduced Jacobian graph of the block diagram model in FIG. 13 according to an illustrative embodiment;

FIG. 16 illustrates another example block diagram model according to an illustrative embodiment;

FIG. 17 illustrates an example Jacobian graph of the block diagram model in FIG. 16 according to an illustrative embodiment;

FIG. 18 illustrates an example reduced Jacobian graph of the block diagram model in FIG. 16 according to an illustrative embodiment;

FIGS. 26A and 26B illustrate exemplary plots of perturbed trajectories of the block diagram model in FIG. 24 according to an illustrative embodiment;

DETAILED DESCRIPTION

Overview

Computational tools may help users model, simulate, and/or analyze dynamic systems by representing the systems as graphical models. Graphical models may be block diagram models composed of connected individual blocks. Graphical model-based computational tools may be provided for a technical computing environment and may allow a user to modify a system. For example, a user may change blocks or connections in the block diagram model.

Computational tools may linearize graphical models into linear models for modeling, simulating, and/or analyzing the graphical models. A linear model may represent the behavior of a graphical model as one or more linear system equations. For example, the output of a complex graphical model having multiple interconnected blocks may be linearized into a single equation based on time and inputs to the graphical model.

Linearizing graphical models may be performed by analyzing blocks and connections within a model. This approach may include drawbacks, such as requiring excessive amounts of memory and/or being computationally intensive.

Exemplary embodiments can provide computational tools that optimize operations associated with linearizing graphical models. For example, an embodiment may use graph theory based optimizations when linearizing a model. Optimized linearization may reduce memory requirements and computational requirements associated with linearizing graphical models.

Optimizing linearization may also optimize sensitivity analysis. Linearized models may be used to perform sensitivity analysis on a graphical model. Sensitivity analysis may include the study of how a variation in an output of a model can be apportioned to different sources of variation. For example, sensitivity analysis may provide insight into the behavior of a system under variations in a parameter, e.g., the gain of a gain block. Sensitivity analysis may find influential parameters in a model. For example, an embodiment may use sensitivity analysis to find parameters having the largest influence in a model. The determined parameters may be useful in identifying one or more dominant parameters of the model and tuning the model.

Illustrative System

Figure 1:
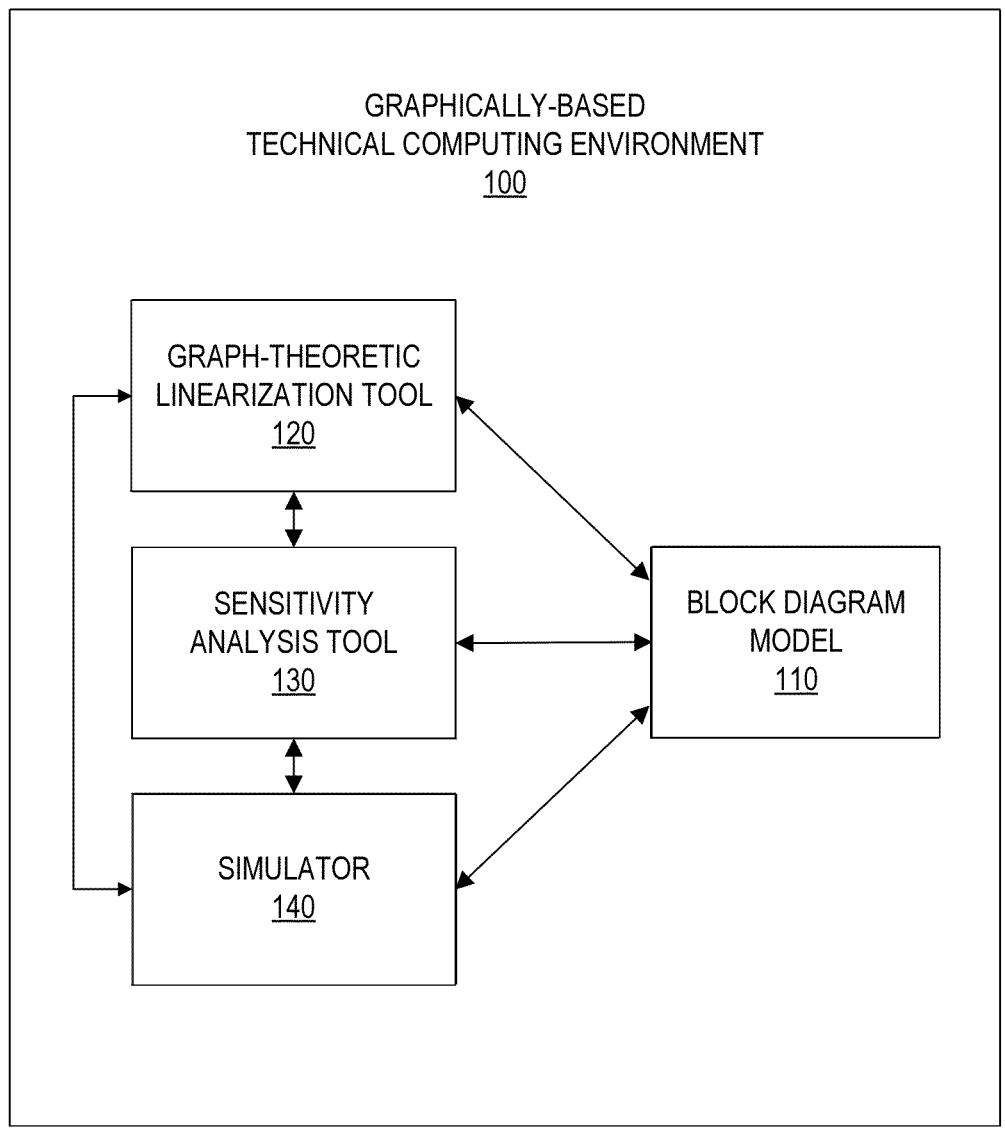
FIG. 1 illustrates an example system for a graphically-based technical computing environment according to an illustrative embodiment.

FIG. 1 illustrates an example system for graphically-based technical computing environment (TCE) 100 according to an illustrative embodiment. TCE 100 may include block diagram model 110, graph theoretic linearization tool 120, sensitivity analysis tool 130, and simulator 140. At least part of model 110 may be a graphical model or a combination of graphical models, such as a time based model, a state based model, a data flow based model, etc. Model 110 may include a one or more blocks.

The blocks of model 110 may have functionalities, behaviors, logic, semantics, computations, and/or executions defined by text, programming language diagrams, computer code, discrete event system specifications (DEVS), hardware logic, etc. Diagram model 110 may also be hierarchical. For example, a block in diagram model 110 may be a subsystem composed of sub-blocks. A subsystem may be a virtual subsystem and not affect the execution of model 110. On the other hand, a nonvirtual subsystem may be a subsystem that may be executed as a single block and thus may be treated like any other block.

The blocks may also include signal routing blocks, for example, a Multiplexer block, a Demultiplexer block, or Selector blocks. Signal routing blocks may route signal connections between other blocks. Signal routing blocks may be virtual and nonvirtual. Virtual routing blocks may not affect execution of the model. Nonvirtual routing blocks may affect execution of the model, for example, by enforcing a layout of storage space for the values of the routed signal.

Blocks of model 110 may include continuous-time blocks and/or discrete-time blocks represented by one or more dynamic equations.

Dynamic equations of continuous-time blocks may be defined by the equations:

$$\dot{x}=f(x,u)$$

$$y=g(x,u) \qquad \text{Eq. (1)}$$

Derivative $\dot{x}$ may be equal to function f of state x and input u, and output y may be equal to function g of state x and input u. State x may be a state variable because state x's time derivative, derivative $\dot{x}$, is used in Equation (1). Input u and output y may be algebraic variables because Equation (1) does not define a time derivative of input u or output y. For analysis of a parameter of a block, the parameter may also be introduced as an additional algebraic variable.

Dynamic equations of discrete-time blocks may be defined by the equations:

$$x_{k+1}=f(x_k,u_k)$$

$$y_k=g(x_k,u_k) \qquad \text{Eq. (2)}$$

where $y_k=y(t_k)$, $x_k=x(t_k)$, and $u_k$=k=1, . . . , where $t_k$=kT is the kth hit time of a discrete sample time.

The delayed value $x_{k+1}$ may be equal to function f of state $x_k$ and input $u_k$, and output $y_k$ may be equal to function g of state $x_k$ and input $u_k$. State $x_k$ may be a state variable because state $x_k$'s time delay, delayed value $x_{k+1}$, is used in Equation (1). Input $u_k$ and output $y_k$ may be algebraic variables because Equation (1) does not define a time delay of input $u_k$ or output $y_k$. For analysis of a parameter of a block, the parameter may also be introduced as an additional algebraic variable.

The states of the continuous-time blocks in diagram model 110 may constitute the set of continuous states of diagram model 110. The states of the discrete-time blocks in diagram model 110 may constitute the set of discrete states of diagram model 110.

Linearization tool 120 may interact with model 110. For example, linearization tool 120 may analyze model 110 and may generate a linear model of model 110. Linearization tool 120 may generate the linear model based on graph theoretic optimization.

Sensitivity analysis tool 130 may interact with model 110 and linearization tool 120. Sensitivity analysis tool 130 may receive a linear model from linearization tool 120. Sensitivity analysis tool 130 may perform sensitivity analysis on model 110 using the linear model.

Simulator 140 may interact with model 110, linearization tool 120, and sensitivity analysis tool 130. Simulator 140 may execute model 110 and may produce an execution result. During execution of model 110, simulator 140 may linearize model 110 using linearization tool 120 and/or may perform sensitivity analysis on model 110 using sensitivity analysis tool 130. A sensitivity of model 110 may change during execution of model 110. Accordingly, linearization tool 120 and sensitivity analysis tool 130 may re-determine a linear model and sensitivity for model 110 during execution of model 110 by simulator 140.

Illustrative Block Diagram Model

Figure 2:
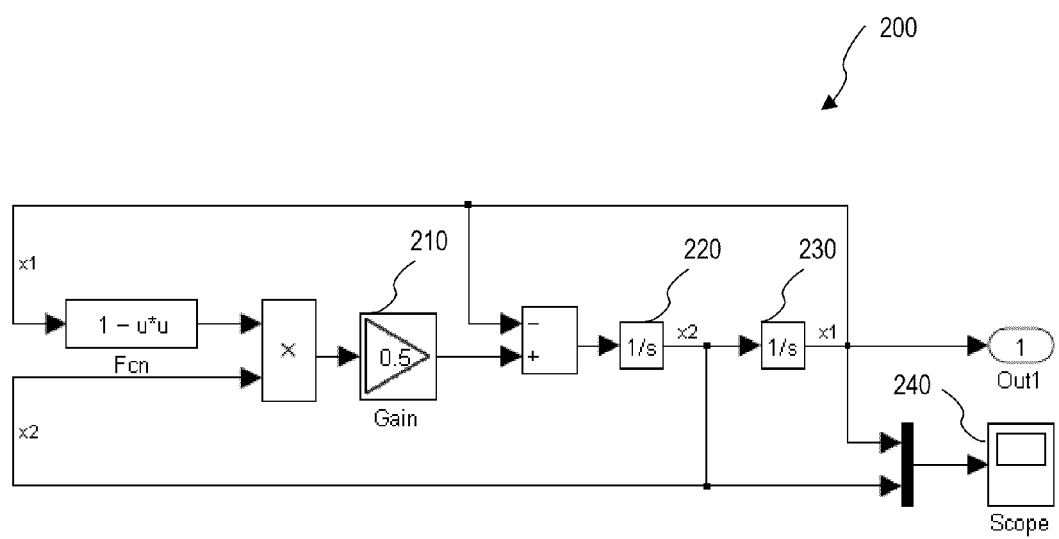
FIG. 2 illustrates an example block diagram model with multiple blocks and connections according to an illustrative embodiment.

FIG. 2 illustrates example block diagram model 200 having multiple blocks and connections according to an illustrative embodiment. Model 200 may include gain block 210, integrator block 220, integrator block 230, scope block 240, as well as other blocks. Gain block 210 may amplify an input signal by a constant gain value to produce an output signal that is an amplified version of the input signal. Integrators 220 and 230 may integrate an input signal to produce an output signal that is an integrated version of the input signal.

Sensitivity analysis may be used to determine a sensitivity of model 200, for example, sensitivity to a variation in the gain of gain block 210. For example, the sensitivity analysis tool may determine how the outputs of integrator 220 and integrator 230 vary based on a variation in the gain of gain block 210. The outputs of integrator 220 and integrator 230 may be represented by respective equations, and the partial derivative of the respective equations with respect to the gain of gain block 210 may be evaluated over a range of time or time increments. The sensitivity analysis performed on model 200 may produce one or more sensitivity plots that display sensitivity results. Plots may be displayed on a display device using a GUI and may include user selectable features, like display size, legend, etc. Sensitivity results may be used by devices, code, users, etc., to make determinations with respect to model 200.

Illustrative Sensitivity Analysis Graph Model

Figure 3A:
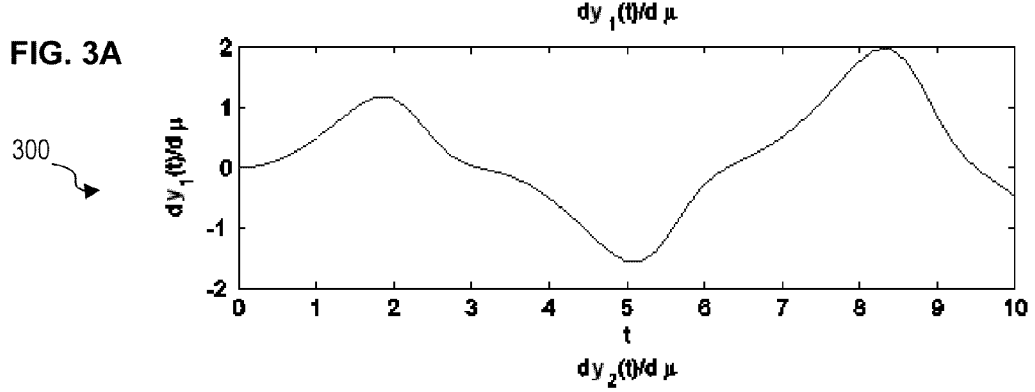
FIGS. 3A and 3B illustrate exemplary sensitivity plots for the block diagram model shown in FIG. 2, according to an illustrative embodiment.
Figure 3B:
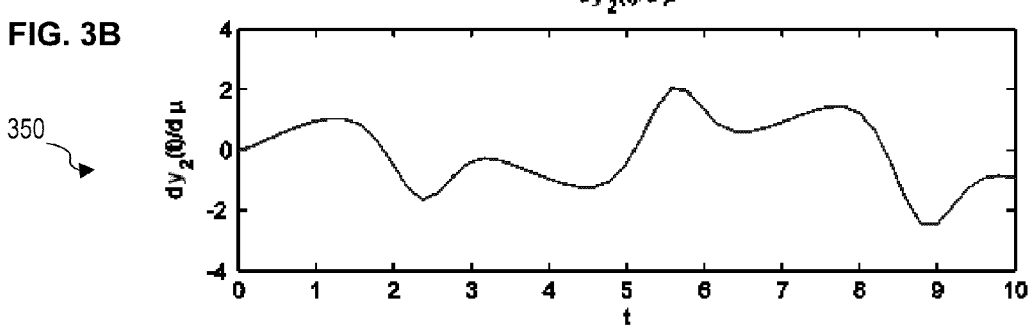

FIGS. 3A and 3B illustrate exemplary sensitivity plots 300 and 350 for model 200, according to an illustrative embodiment. Sensitivity plot 300 may illustrate the sensitivity of the output of integrator 220 with respect to a gain value of gain block 210. Sensitivity plot 300 may represent sensitivity by graphing the partial derivative of an output function y of integrator 220 with respect to a gain value of gain block 210 over time t. Referring now to FIG. 3B, sensitivity plot 350 may similarly represent sensitivity by graphing the partial derivative of an output function y of integrator 230 with respect to a gain value of gain block 210 over time t.

Exemplary Processing for Generating a Closed-Loop Jacobian

A linear model of model 110 may need to be determined by linearization tool 120 before sensitivity in model 110 may be determined by sensitivity analysis tool 130. Blocks in model 110 may be first linearized, and the model 110 linearized based on linearization results of the block linearizations.

A Jacobian of a block may represent the linearization of the block. A Jacobian may be a matrix that represents relationships between variables of the block. For example, a Jacobian may be defined as:

$$J = \begin{bmatrix} \frac{\partial \varphi}{\partial x} & \frac{\partial \varphi}{\partial u} \\ \frac{\partial \mu}{\partial x} & \frac{\partial \mu}{\partial u} \end{bmatrix} = \begin{bmatrix} A & B \\ C & D \end{bmatrix} \quad \text{Eq. (3)}$$

Jacobians for individual blocks or subsystems may be combined to produce a Jacobian for a part of or all of the model. The Jacobians of blocks in model 110 may be concatenated by combining the Jacobians in a diagonal direction to form a matrix $$\begin{bmatrix} A_o & B_o \\ C_o & D_o \end{bmatrix} \text{ for model 110}$$

The Jacobians of blocks may be used to determine a closed-loop model Jacobian. In one embodiment, the closed-loop model Jacobian may represent the Jacobians of the set of connected blocks representing model 110 and represent all connections between the blocks.

By way of example, given a set of non-virtual blocks $\{b_1, \ldots, b_n\}$, assume blocks in a subset of it $\{b_{i_1}, \ldots, b_{i_{n_x}}\}$ have states, and further assume that the non-virtual blocks in these sets are enumerated in the same order. Here, the open-loop model Jacobian may be defined as a tuple including the concatenated Jacobian matrix, $S_{open}$, and the connection matrix, M.

$$J = (S_{open}, M) = \left( \begin{bmatrix} A_o & B_o \\ C_o & D_o \end{bmatrix}, M \right)$$

where, the sub-matrices $A_o$, $B_o$, $C_o$, and $D_o$ are $$A_o = \begin{bmatrix} A_1 & & \\ & \ddots & \\ & & A_{n_z} \end{bmatrix} \quad B_o = \begin{bmatrix} B_1 & & \\ & \ddots & \\ & & B_{n_z} \end{bmatrix} \quad \text{Eq. (4)}$$

$$C_o = \begin{bmatrix} C_1 & & \\ & \ddots & \\ & & C_{n_z} \end{bmatrix} \quad D_o = \begin{bmatrix} D_1 & & \\ & \ddots & \\ & & D_{n_z} \end{bmatrix}$$

The matrix M may include a set of matrices induced by the connections between blocks (e.g., non-virtual blocks), and may also be referred to as an interconnection matrix.

An associated matrix for a connection between output variable y and input variable u, u=y, may be calculated in the following way.

$$\frac{\partial u}{\partial y} = I_{n \times n} \quad \text{Eq. (5)}$$

For signal routing blocks (e.g., virtual routing blocks), the relationship between the elements of u and y may be described as a generic mapping between the block output y and block input u $$u_j = y_i, \text{ where, where } (i,j) \in M \quad \text{Eq. (6)}$$

Where $u \in \mathbb{R}^d$, $y \in \mathbb{R}^n$ and $M \subseteq \{1, \ldots, n\} \times \{1, \ldots, d\}$ is the binary relationship that represents the connection of each individual elements of the signal.

For a block $b_q$ and a block $b_p$, the Jacobian of the connection between the output of $b_q$ and the input of $b_p$ may be written as:

$$\frac{\partial u_p}{\partial y_q} = M_{p,q} \equiv [m_{i,j}]_{d \times n} \text{ where } m_{i,j} = \begin{cases} 0, & (i,j) \notin M \\ 1, & (i,j) \in M \end{cases} \quad \text{Eq. (7)}$$

If there is no signal connecting the output of $b_q$ with the input of $b_p$, the Jacobian of the connection may be written as:

$$M_{p,q} = [0]_{d \times n} \quad \text{Eq. (8)}$$

Interconnection matrix M of the model may be represented as the concatenation of the interconnections matrix of all the signals.

$$M = \begin{bmatrix} M_{1,1} & M_{1,2} & M_{1,3} & \ldots & M_{1,n} \\ M_{2,1} & M_{2,2} & M_{2,3} & \ldots & M_{2,n} \\ \vdots & \vdots & \ddots & & \vdots \\ M_{n,1} & M_{n,2} & M_{n,3} & \ldots & M_{n,n} \end{bmatrix} \quad \text{Eq. (9)}$$

An open-loop model Jacobian may be used to determine a closed-loop model Jacobian of a model.

The closed-loop model Jacobian may be the system matrix defined as $$A_{closed} = F(J) \quad \text{Eq. (10)}$$

where F may be a linear fractional transformation.

Figure 4:
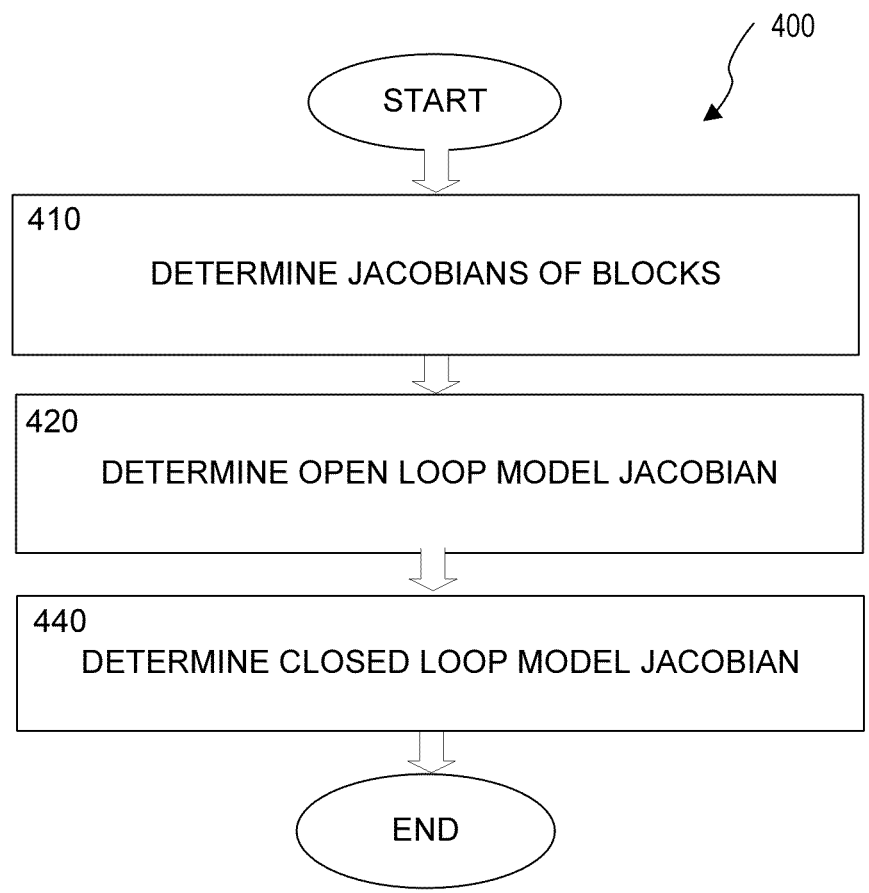
FIG. 4 illustrates exemplary processing for linearizing a block diagram model according to an illustrative embodiment.

FIG. 4 illustrates exemplary processing 400 for linearizing model 110 according to an illustrative embodiment. Linearization tool 120 may determine Jacobians of blocks in model 110 (act 410). For example, Jacobians of blocks may be determined by calculating a Jacobian based on the functionality and/or behavior of the blocks. Jacobians of blocks may also be pre-defined (e.g., by an author of the block) and retrieved from a data store for use with linearization tool 120.

Linearization tool 120 may determine an open-loop model Jacobian based on the Jacobians of the blocks (act 420). Linearization tool 120 may determine the open-loop model Jacobian by concatenating Jacobians of the blocks and determining an interconnection matrix for the connections between the blocks.

Linearization tool 120 may determine a closed-loop model Jacobian based on the open-loop model Jacobian (act 440). The closed-loop model Jacobian may be used by sensitivity analysis tool 130 to perform sensitivity analysis.

Exemplary processing 400 for linearizing model 110 may be further described in co-filed U.S. patent application Ser. No. 13/291,899 entitled "VISUALIZATION OF DATA DEPENDENCY IN GRAPHICAL MODELS," filed Nov. 8, 2011.

In some implementations, an underlying assumption may be that all inputs and outputs of blocks must be first accounted for and present in the open-loop model Jacobian matrices. In other words, the assumption may be that all the Jacobians of blocks must be included in the open-loop model Jacobian for a closed-loop model Jacobian to be determined. This assumption may make it difficult to reduce temporary variables in the computation. For example, a block may be required to be accounted for even if the block is not connected to any other blocks. For large models, attempting to determine a closed-loop model Jacobian based on an intermediate open-loop model Jacobian may cause a computer to exhaust memory while computing the linearization result.

Illustrative Jacobian Graph

An exemplary technique for determining a linear model for model 110 may be optimized using Jacobian graphs. Jacobian graphs may be graph representations of Jacobians. The graph may be stored in memory and not graphically presented to the user. For example, a Jacobian graph may be a directed graph with two or more nodes and one or more edges, a function that assigns a real matrix to the one or more edges of the directed graph, and at least one of a set of zero or more state variables or a set of zero or more algebraic variables. With Jacobian graphs, an assumption that all block inputs, outputs, and states must be first accounted for and present in the open-loop model Jacobian matrices may be removed.

Figure 5A:
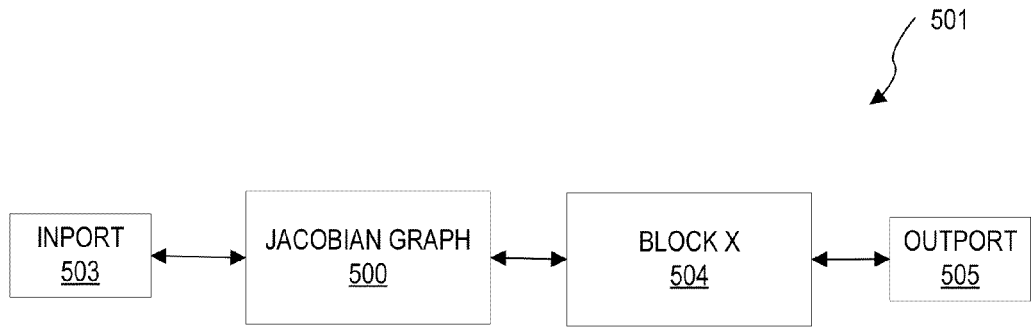
FIGS. 5A and 5B illustrate an example Jacobian graph according to an illustrative embodiment.

FIG. 5A illustrates block model diagram 501, according to an illustrative embodiment. Block model diagram 501 may include inport block 503, exemplary Jacobian graph 500, block x 504, and outport block 505 according to an illustrative embodiment. Jacobian graph 500 may capture the linear relationship among one or more inputs, one or more outputs, and one or more states, in a graphical manner.

Figure 5B:
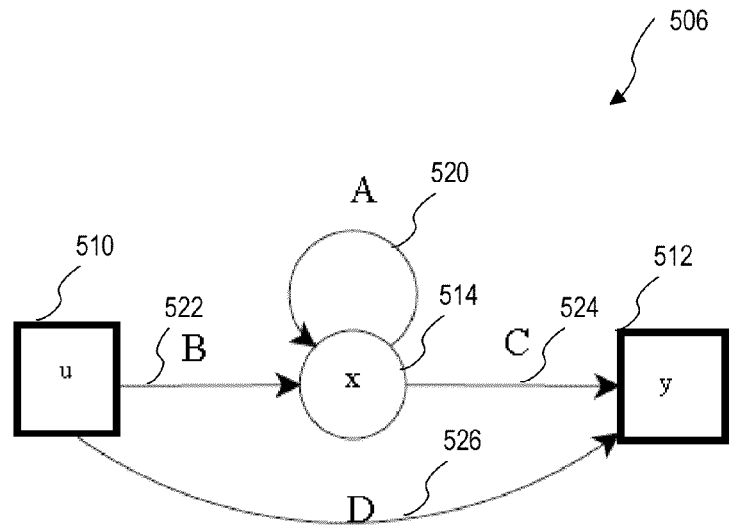

FIG. 5B illustrates example Jacobian graph 506, according to an illustrative embodiment. Example Jacobian graph 506 may capture the linear relationship of input u, output y, and state x of a block in a graphical manner. Example Jacobian graph 506 may include one or more vertices 510, 512, 514, and one or more edges 520, 522, 524, and 526. Vertices 510, 512, 514 may correspond to variables in a block or model 110. Vertex 510 may represent input u, vertex 512 may represent output y, and vertex 514 may represent state x. Edges 520, 522, 524, 526 may represent respective connections for vertices 510, 512, 514.

The respective values of edges 520, 522, 524, 526 may correspond with Jacobian sub-matrices. For example, edge 520 connecting state x back to state x may represent Jacobian sub-matrix A, which may be a state transition matrix describing how a value of state x at one time may affect the value of state +x at another time.

Jacobian graph 500 may be defined by the tuple J≡(G, V or, IC), where

1. $G = (V, E)$ is a directed graph;    Eq. (11)

a. $V = \{v_1, \ldots, v_n\}$ represents the states $x_1, \ldots, x_n$, and b. $(v_i, v_j) \in E$ iff $A_{ji} \neq 0$ $v_i \rightarrow v_j$ iff $(v_i, v_j) \in E$ c. $E = [e_{i,j}]_{n \times n} \in \{0, 1\}^{n \times n}$ d. $\varepsilon_{ij} = \begin{cases} 0, & a_{ij} = 0 \\ 1, & a_{ij} \neq 0 \end{cases}$ and, $e_j, i = 1$ may be defined as iff $v_i \rightarrow v_j$.

2. Var=X∪Y a set of variables, where X is a set of state variables and Y a set of algebraic variables. Each variable is in one-to-one correspondence with the vertices $v_i \in V$, $Var(v_i)$ may be a variable corresponding to vi.

3. IC:E→ℝ$^{m \times n}$ a function that assigns a real matrix to each edge. For $$K(v_i, v_j) = K, v_i \xrightarrow{K} v_j$$

may be a short hand notation

The linear relationship between sets of variables in the Jacobian graph 500 may be captured as an input-output sub-matrix (IOSM) corresponding to Jacobian graph 500. An IOSM may be defined by the following definition:

Let J=(G, Var, K) be a Jacobian graph, and I={i$_1$, i$_2$, . . . , i$_m$} ⊆ Var be a set of variables and O={o$_1$, o$_2$, . . . , o$_n$} ⊆ Var a set of variables. The input-output sub-matrix (IOSM) of a Jacobian graph J for the given sets of input and output variables may be defined as the matrix IOSM(J,I,O)=[K$_{j,k}$]$_{m \times n}$ where $$K_{j,k} = \begin{cases} K(i_j, o_k), & \text{if } i_j \rightarrow o_k \\ 0, & \text{otherwise.} \end{cases} \quad \text{Eq. (12)}$$

The IOSM may be used to construct a matrix from a portion of Jacobian graph 500. Given Jacobian graph 500, an IOSM for any given set of input and output variables may be generated by looping through the connections between the variables and filling in the corresponding entries in the matrix.

Where Jacobian graph 500 represents an entire model 110, the IOSM of Jacobian graph 500 may represent the open-loop model Jacobian of model 110. The open-loop model Jacobian of model 110 may be determined for Jacobian graph 500 based on the following.

For a given set of interconnected blocks indexed by {1, . . . n}, let

U={u$_1$, . . . , u$_n$} denote the input variables of the blocks,
Y={y$_1$, . . . , y$_n$} denote the output variables of the blocks,
X={x$_1$, . . . , x$_n$} denote the state variables, and
J=(G,X∪U∪Y,K) denote the Jacobian graph corresponding to the set of blocks.

Then $$Ao = IOSM(J, X, X)$$

$$Bo = IOSM(J, U, X)$$

$$Co = IOSM(J, X, Y)$$

$$Do = IOSM(J, U, Y)$$

$$M = IOSM(J, Y, U) \quad \text{Eq. (13)}$$

Exemplary Processing for Storing a Jacobian as a Graph

Figure 6:
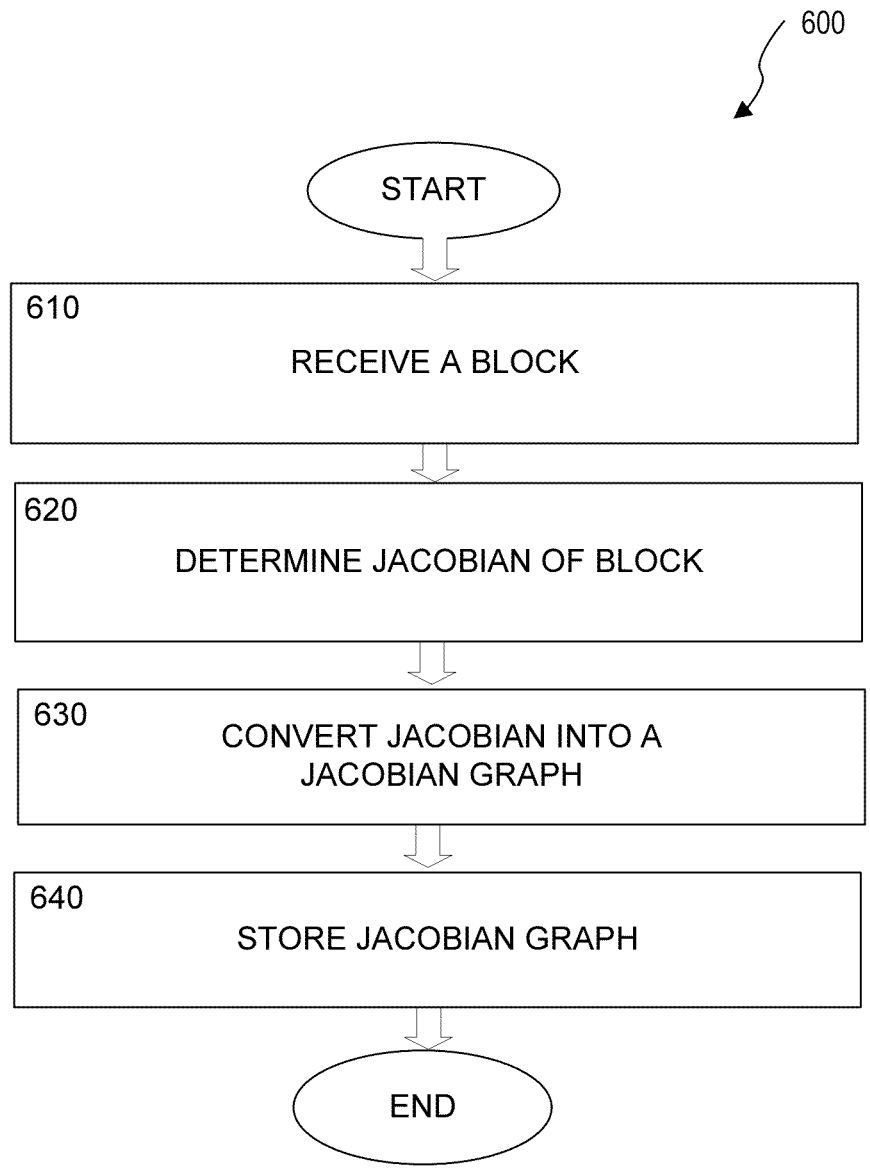
FIG. 6 illustrates exemplary processing for storing a Jacobian of a block as a graph according to an illustrative embodiment.

FIG. 6 illustrates exemplary processing for storing a Jacobian of a block as a graph according to an illustrative embodiment. Linearization tool 120 may receive a block (act 610). For example, linearization tool 120 may receive model 110 which may include one or more blocks. Linearization tool 120 may determine a Jacobian of a block in the received model (act 620). For example, linearization tool 120 may calculate the Jacobian of a block in model 110 or may retrieve a pre-defined Jacobian of the block from storage. Linearization tool 120 may convert the Jacobian into a Jacobian graph (act 630). The Jacobian graph may be stored (act 640). For example, linearization tool 120 may store the Jacobian as Jacobian graph 500. Jacobian graph 500 may be stored as an IOSM.

Exemplary Operations for Jacobian Graphs

Basic operations on Jacobian graphs 500 may be used to linearize an entire model 110 based on Jacobian graphs 500. Examples of basic operations can include, but are not limited to, sum operations, vertex reduction operations, subtraction operations for deleting portions of the graph, expansion operations for splitting one vertex into multiple vertices, or quotient operations for grouping multiple vertices into one vertex. The analysis on the Jacobian graph may include reachability analysis for computing transitive closure, computing closed-loop Jacobian matrices, etc. Operations on Jacobian graphs 500 may modify graphs 500, while analysis on Jacobian graphs may not modify graphs 500.

A sum operation may be practiced in an exemplary embodiment as follows. For Jacobian graph $J_1=(G_1, Var_1, K_1)$ and $J_2=(G_2, Var_2, K_2)$, the sum of Jacobian graphs 500 may be defined as $J=J_1+J_2=(G, Van_1, Var_2, K)$, where 1. $G=(V,E)$ where $V=(V_1 \cup V_2)$ and $E=(E_1 \cup E_2)$
2. IC is given by the following $$K(i, j) = \begin{cases} K_1(i, j) & \text{if } (i, j) \in E_1 \land (i, j) \notin E_2 \\ K_2(i, j) & \text{if } (i, j) \notin E_1 \land (i, j) \in E_2 \\ K_1(i, j) + K_2(i, j) & \text{if } (i, j) \in E_1 \land (i, j) \in E_2 \\ \emptyset & \text{otherwise.} \end{cases} \quad \text{Eq. (14)}$$

Another basic operation may be the vertex reduction operation. Vertex reduction may include removing a vertex from a graph without changing the final analysis result of the graph. Jacobian graph 500 may be reduced using vertex reduction to reduce computation time and memory usage when subsequent computations are performed based on Jacobian graph 500.

A vertex may be reduced from Jacobian graph 500 without changing the result of the closed-loop Jacobian if all of the following conditions are true.

1. the vertex represents an algebraic variable, and
2. the vertex's Markowitz degree is less than the sum of the number of incoming and the number of out-going edges. The Markowitz degree of a vertex in a directed graph is the product of the number of incoming edges to the vertex and the number of out-going edges from the vertex.

As an example of vertex reduction, a graph may consist of a single path $a_0 \rightarrow \ldots \rightarrow a_n$. Assuming that all the vertexes along the path represent algebraic variables, Jacobian graph 500 may capture the linear relationship of the variables along the path. Therefore, Jacobian graph 500 can be trivially reduced to $a_0 \rightarrow a_n$ with a reduced function $K_r(0, n)=K(0, 1)K(1,2) \ldots K(n-1, n)$. Given Jacobian graphs $J=(G, Var, K)$ and a set of algebraic variables $Y=\{y_1, \ldots, y_k\}$ where Y is not involved in any algebraic loops, a reduced graph may be defined as $J_r=J \backslash Y$, where $J_r$ is the result of the following procedure.

FOREACH $y_i \in Y$:

FOREACH pair $a, b$ such that $a \xrightarrow{K_a} y_i$ and $y_i \xrightarrow{K_b} b$:

$J = J + \left( a \xrightarrow{F(y_i, K_a, K_b)} b \right)$

END FOREACH $E = E \backslash \{(a, y_i), (y_i, b)\}$

Remove the self loop at $y_i$, if aray.

$V = V \backslash \{y_i\}$

END FOREACH

In the above procedure, the operation "\" may be a set difference operation, i.e., $A \backslash B = A \cap \overline{B}$. In the reduced graph $J_r$, the vertices in Y may be removed along with the edges that involve vertices in Y.

A third basic operation for Jacobian graph 500 may include determining a closed-loop Jacobian matrix. The closed-loop model Jacobian may be simply defined as the IOSM of reduced Jacobian graph 500.

For Jacobian graphs $J=(G, Var, K)$ and a set of algebraic variables $Y=\{y_1, \ldots, y_k\}$, and $I=\{i_1, i_2, \ldots, i_m\} \subseteq Var$ be a set of input variables and $O=\{o_1, o_2, \ldots, o_n\} \subseteq Var$ a set of output variables such that $Y \cap I = \emptyset$ and $Y \cap O = \emptyset$. The closed-loop Jacobian is defined as:

$$J_c(J, I, O, Y) = IOSM(J \backslash Y, I, O) \quad \text{Eq. (15)}$$

Exemplary Processing for Constructing a Model Jacobian as a Graph

Using the summation operation, Jacobian graph 500 for an entire model 110 may be constructed by determining Jacobian graph 500 for the blocks in model 110, and summing the Jacobian graphs 500 of the blocks based on the connections between the blocks.

Figure 7:
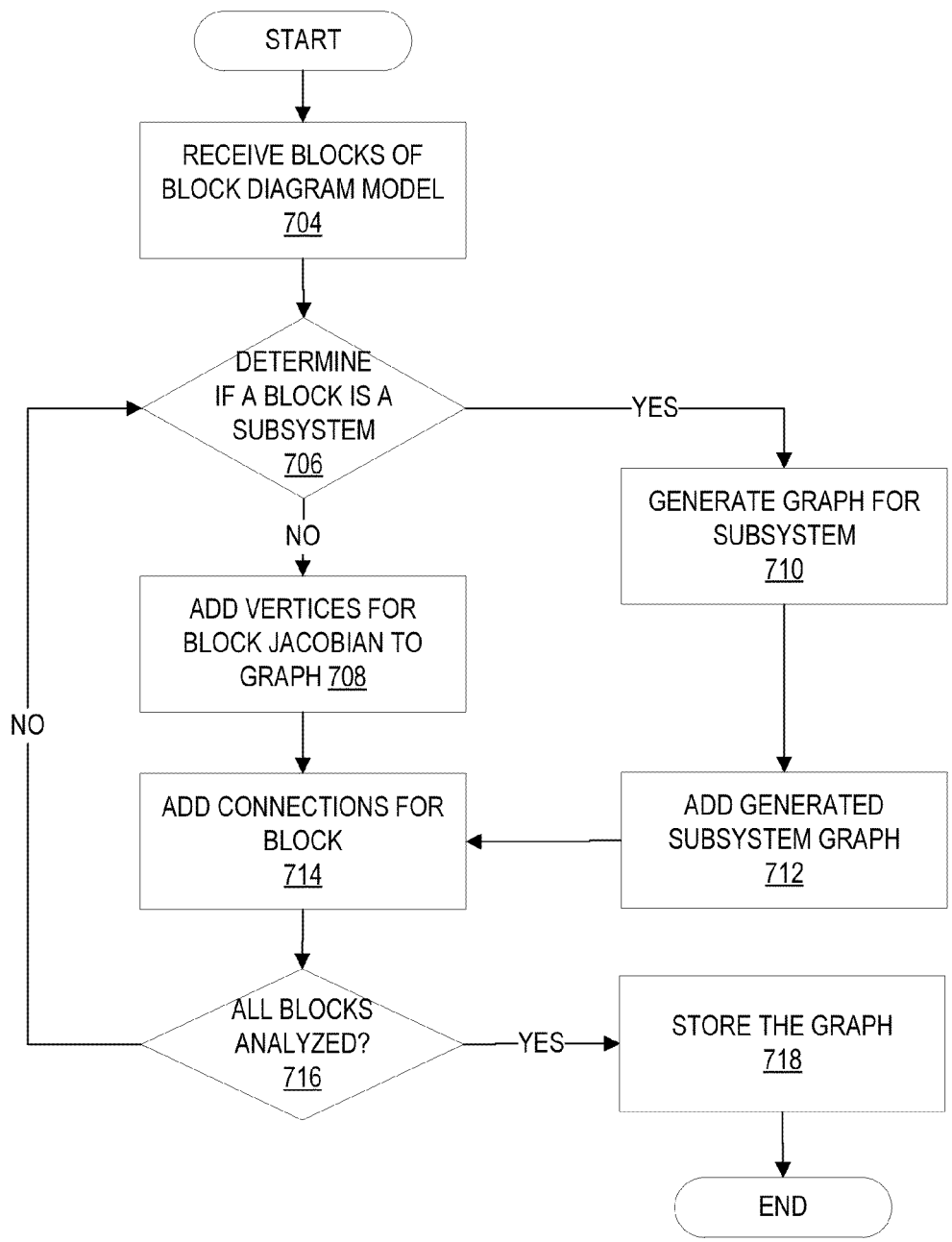
FIG. 7 illustrates exemplary processing for constructing a model Jacobian as a graph according to an illustrative embodiment.

FIG. 7 illustrates exemplary processing 700 for constructing a model Jacobian as a Jacobian graph according to an illustrative embodiment. An algorithm to construct a Jacobian graph of model 110 may be recursive, for example, to account for a hierarchical model 110.

Linearization tool 120 may first receive blocks of model 110 (act 704). Linearization tool 120 may select a block and may determine if the block is a subsystem having sub-blocks (act 706).

If the block is not a subsystem, linearization tool 120 may add vertices for the Jacobian of the block to a Jacobian graph of model 110 (act 708).

In contrast, if the block is a subsystem, linearization tool 120 may generate a Jacobian graph for the subsystem (act 710). For the given subsystem, the algorithm may loop through the blocks in the subsystem. If the block is a subsystem (e.g., a non-virtual subsystem), the procedure may recursively call itself to compute a Jacobian graph $J_s$ of the subsystem. In the case where a block is a subsystem, intermediate input and output vertices of the Jacobian graph of the subsystem may be removed.

Linearization tool 120 may add the generated graph of the subsystem to the Jacobian graph of model 110 (act 712).

Linearization tool 120 may add connections to vertices added in act 708 or the Jacobian graph added in act 712 (act 714). If all blocks have not been analyzed yet (decision act 716), processing may return to act 706 until all blocks in the model are analyzed.

If all blocks have been analyzed, the resulting Jacobian graph may represent the entire model 110 and linearization tool 120 may store the resulting Jacobian graph (act 718).

Figure 8:
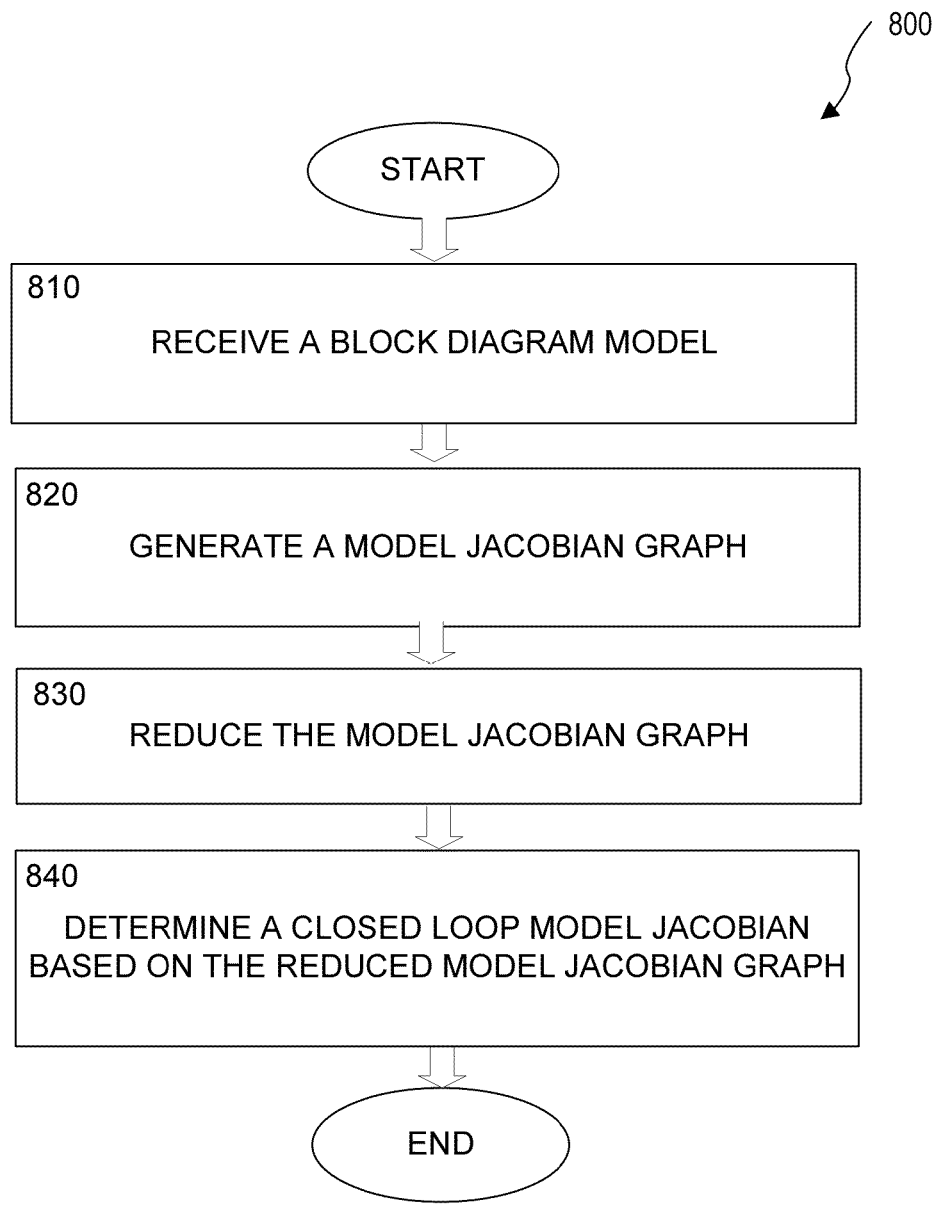
FIG. 8 illustrates exemplary processing for determining a closed-loop model Jacobian based on a reduced model Jacobian graph according to an illustrative embodiment.

The processing of FIG. 7 may be implemented in the following exemplary code:

Algorithm name: generate jac graph
Input: A non-virtual subsystem S
Output: Open-loop Jacobian graph J
Algorithm:
  B=get sorted blocks
  FOREACH block b in B:
    IF b is a nonvirtual subsystem:
      $J_S$=generate jac graph($S_b$)
      J=$J_s$+J
    ELSE:
      add vertices for jacobian of block (J, b)
    END IF
      add connections for block (J, b)
  END FOREACH
  return J FIG. 8 illustrates exemplary processing 800 for determining a closed-loop model Jacobian based on a reduced model Jacobian graph according to an illustrative embodiment.

Linearization tool 120 may receive model 110 (act 810). Linearization tool 120 may generate a model Jacobian graph from model 110 (act 820). For example, the model Jacobian graph may be generated using the exemplary processing of FIG. 7.

Linearization tool 120 may reduce the model Jacobian graph (act 830). Linearization tool 120 may check vertices in the model Jacobian graph to determine if the vertices are reducible. For example, linearization tool 120 may determine that a vertex is reducible if the vertex belongs to an algebraic variable and has a Markowitz degree less than the sum of the number of incoming edges and the number of outgoing edges of the vertex. If a vertex is reducible, linearization tool 120 may reduce the vertex from the model Jacobian graph.

Linearization tool 120 may determine a closed-loop model Jacobian based on the reduced model Jacobian graph (act 840). Determining a closed-loop model Jacobian may include determining input-output sub-matrices of the reduced model Jacobian graph.

Exemplary code for implementing a graph theory based algorithm for determining a closed-loop model Jacobian based on exemplary processing 800 may be as follows:

Algorithm Name: graph jacobian
Input: A model mdl
Output: Closed-loop Jacobian matrix $A_{closed}$
Algorithm:
  J=generate jac graph(mdl)
  FOREACH vertex n in J:
    IF n is reducible:
      J=J\n
    END IF
  END FOREACH
  Ao=IOSM(J, X, X)
  Bo=IOSM(J, U, X)
  Co=IOSM(J, X Y)
  Do=IOSM(J, U, Y)
  M=IOSM(J, Y, U)
  compute LFT $A_{closed}$=$J_c$(J, X, X, Var\X)

Exemplary Reductions of Block Diagram Models

Figure 9:
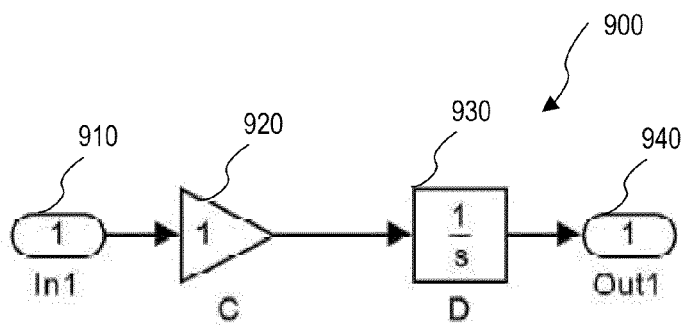
FIG. 9 illustrates another example block diagram model according to an illustrative embodiment.

FIG. 9 illustrates example block diagram model 900 according to an illustrative embodiment.

Model 900 may include input block 910, gain block 920, integrator block 930, and output block 940. The output of input block 910 may be connected to the input of gain block 920. The output of gain block 920 may be connected to the input of integrator block 930. The output of integrator block 930 may be connected to the input of output block 940. Exemplary processing 700 (FIG. 7) for constructing a Jacobian of entire model 110 as a Jacobian graph may be applied to model 900 to construct a Jacobian graph of the entire model 900. The constructed Jacobian graph may be used to support additional processing activities.

Figure 10:
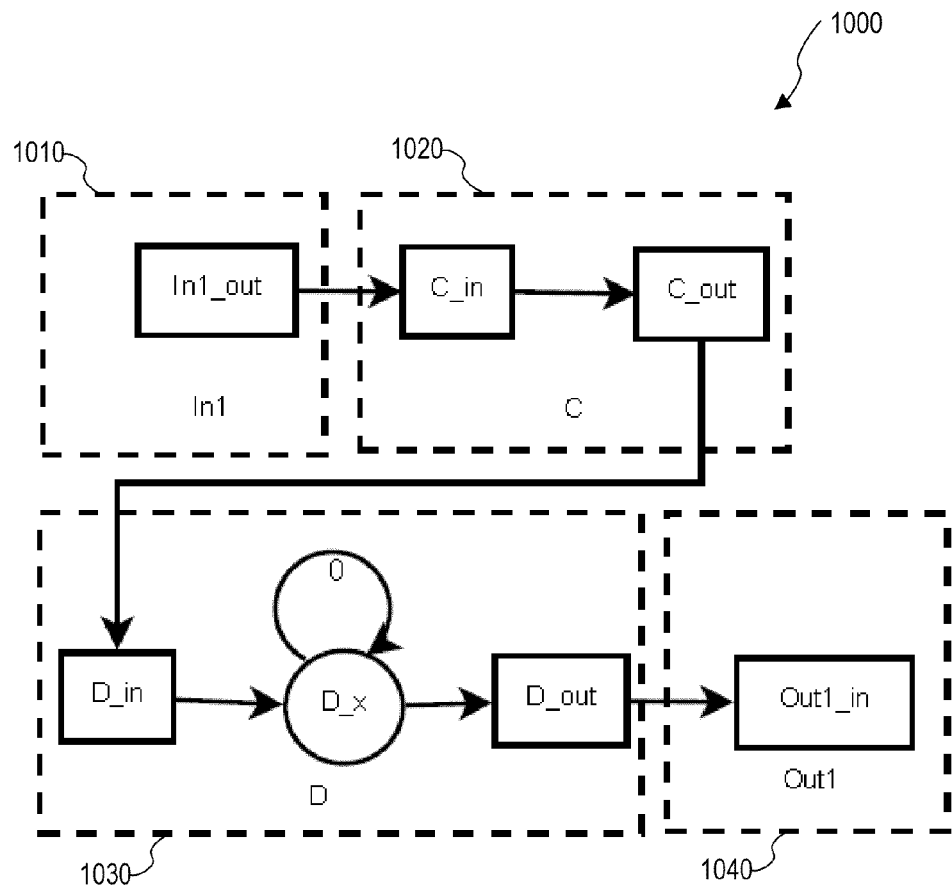
FIG. 10 illustrates an example Jacobian graph of the block diagram model in FIG. 9 according to an illustrative embodiment.

FIG. 10 illustrates example Jacobian graph 1000 of model 900 (FIG. 9) according to an illustrative embodiment. Jacobian graph 1000 may be a Jacobian graph of the entire block diagram model 900. The portion of Jacobian graph 1000 in area 1010 may correspond to a Jacobian graph of input block 910. The portion of Jacobian graph 1000 in area 1020 may correspond to a Jacobian graph of gain block 920. The portion of Jacobian graph 1000 in area 1030 may correspond to a Jacobian graph of integrator block 930. Lastly, the portion of Jacobian graph 1000 in area 1040 may correspond to a Jacobian graph of output block 940.

Figure 11:
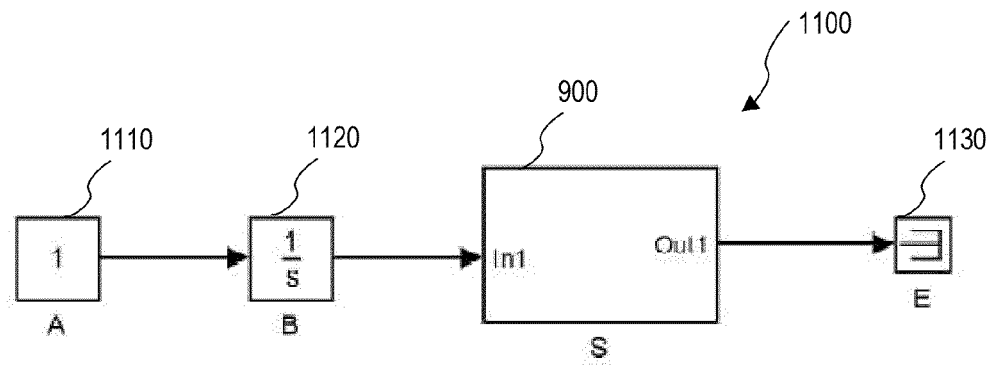
FIG. 11 illustrates an example block diagram model where the block diagram model in FIG. 9 is a subsystem according to an illustrative embodiment.

FIG. 11 illustrates an example model 1100 where block diagram model 900 in FIG. 9 is a subsystem according to an illustrative embodiment.

Block model 1100 may include constant block 1110, integrator block 1120, subsystem 900, and terminator 1130. The output of constant block 1110 may be connected to the input of integrator block 1120. The output of integrator block 1120 may be connected to the input of subsystem 900. The output of subsystem 900 may be connected to the input of terminator 1130. Exemplary processing 700 (FIG. 7) for constructing a model Jacobian as a Jacobian graph may be applied to model 900 to construct a Jacobian graph of entire diagram model 900.

Figure 12:
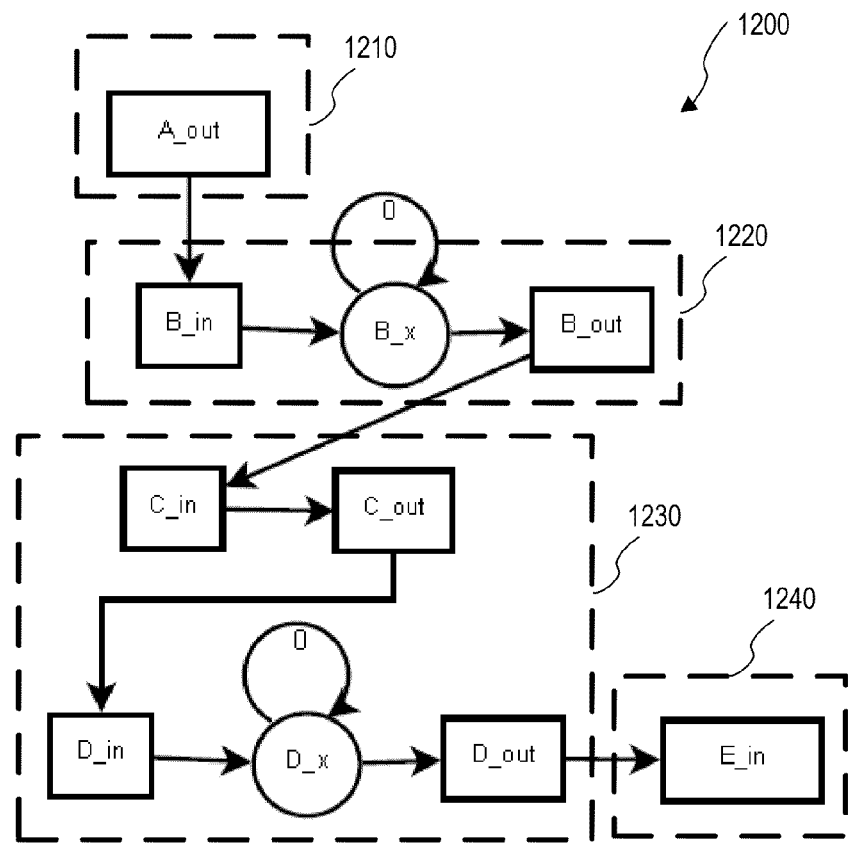
FIG. 12 illustrates an example Jacobian graph of the block diagram model of FIG. 11 according to an illustrative embodiment.

FIG. 12 illustrates an example Jacobian graph 1200 of block model 1100 of FIG. 11 according to an illustrative embodiment. Jacobian graph 1200 may be a Jacobian graph of the entire model 1100. The portion of graph 1200 in area 1210 may correspond to a Jacobian graph of constant block 1110. The portion of Jacobian graph 1200 in area 1220 may correspond to a Jacobian graph of integrator block 1120. The portion of Jacobian graph 1200 in area 1230 may correspond to a Jacobian graph of block diagram model 900. As can be seen, the portion of Jacobian graph 1200 in area 1230 may be identical to Jacobian graph 1000 with the omission of the input block portion 1010 and output block portion 1040 of Jacobian graph 1000. Lastly, the portion of Jacobian graph 1200 in area 1240 may correspond to a Jacobian graph of terminator 1130.

FIGS. 13-15 illustrate how exemplary processing 800 for determining a closed-loop model Jacobian may be applied to an exemplary model.

FIG. 13 illustrates example model 1300 according to an illustrative embodiment.

FIG. 14 illustrates example Jacobian graph 1400 of model 1300 according to an illustrative embodiment. Model 1300 may include inport block (i) connected to an additive input (+) of add block (a). The output of add block (a) may be used as the input for integrator (b). The output of integrator (b) may be used as the input to outport block (o) of model 1300, and the output of integrator (b) may also be used as the input to gain block (c). The output of gain block (c) may be used as a subtractive input (−) to add block (a).

Graph 1400 may be an unreduced Jacobian graph of model 1300 and may be generated based on exemplary processing 700 (FIG. 7). The output variables in model 1300 are suffixed by 'o' followed by the port number. The input variables in model 1300 are suffixed by 'i' followed by the port number. The state variables in model 1300 are suffixed by 'x'. State variables are shown in ellipses and algebraic variables are shown in boxes. The labels on the edges show the connection Jacobian for the corresponding connections between the block input and output.

FIG. 15 illustrates an example reduced Jacobian graph 1500 of block diagram model 1300 according to an illustrative embodiment. Reduced Jacobian graph 1500 may be generated based on reduction techniques described in exemplary processing 800 (FIG. 8) for determining a closed-loop model Jacobian based on a reduced model Jacobian graph. Reduced Jacobian graph 1500 may show most of the intermediate algebraic variables are reduced, except for the output variable of inport block (i) and the input variable of outport block (o). The state variable b_x may not be reducible and thus remains in reduced Jacobian graph 1500.

FIGS. 16-18 illustrate how exemplary processing 800 for determining a closed-loop model Jacobian may be applied to an exemplary model.

FIG. 16 illustrates example model 1600 according to an illustrative embodiment. Model 1600 includes an algebraic loop made of the feedback loop formed by the Add block and the Gain block. FIG. 17 illustrates example graph 1700 of diagram model 1600 in FIG. 16 according to an illustrative embodiment. Graph 1700 may be an unreduced Jacobian graph 500 of the model generated based on exemplary processing 700 (FIG. 7). Graph 1700 shows there are four variables (f, b, c, and d) forming an algebraic loop. FIG. 18 illustrates an example reduced graph 1800 of block diagram model 1600 in FIG. 16 according to an illustrative embodiment. Reduced graph 1800 may be generated based on reduction described in exemplary processing 800 (FIG. 8). Graph 1800 shows all the variables in the algebraic loop are reduced, resulting in an acyclic Jacobian graph.

Exemplary Processing for Sensitivity Analysis

A linearized model may be used to perform sensitivity analysis for parameters in a model. Sensitivity analysis may determine how a parameter of a block in a model affects the behavior of the model. Referring back to FIG. 1, sensitivity analysis tool 130 may be used to perform such sensitivity analysis on model 110.

Sensitivity analysis for a parameter of a block in a model may be separated into two sub-problems. The first sub-problem may determine how the output of a block affects the behavior of a model. The second sub-problem may determine how the parameter of the block affects the output of the block.

The first sub-problem may be solved by linearizing a model. As previously discussed, a model Jacobian may be generated when linearizing a model. The model Jacobian may contain information describing how changes in variables affect other variables. Accordingly, the model Jacobian may describe how the output of a block affects the behavior of a model.

Consider an ordinary differential equation (ODE) system model given in the following form:

$$\dot{x} = f(x,p,t) \text{ (system equation)} \qquad \text{Eq. (16)}$$

where p is a set of constant parameters.

An initial condition of the model may be a function of p or the initial condition may be provided implicitly. By way of example, the initial condition may be provided implicitly and the system equation may have a unique solution trajectory x(t,p) for any values of p in the domain of interest. If the trajectory x(t,p) is differentiable over p in the domain of interest, Then the trajectory sensitivity may then be defined as the partial derivative of x(t, p) over p.

$$s(t, p) \equiv \frac{\partial x}{\partial p}(t, p) \qquad \text{Eq. (17)}$$

Computing the trajectory sensitivity may require solving the original system equation and the sensitivity equation at the same time:

$$\dot{x} = f(x, p, t) \qquad \text{Eq. (18)}$$

$$\dot{s} = \frac{\partial f}{\partial x}s + \frac{\partial f}{\partial p} \text{(sensitivity equation)}$$

By way of example, consider the case where the rows of the linearized system matrix $$\frac{\partial f}{\partial x}$$

are linearly independent, which make the linear system a linear ODE system. To derive the sensitivity ODE, a prerequisite may be to compute the system Jacobian matrix (the first term in the sensitivity equation) and parameter sensitivity of the derivative (the second term in the sensitivity equation).

Parameter sensitivity of the derivative may be determined from information on the block. Parameter sensitivity may be represented by a parameter Jacobian (i.e., the partial derivative of the system equation with respect to the block parameter). In determining parameter sensitivity, state-less blocks may be analyzed. A block with one or more states may be re-modeled as a non-virtual subsystem (e.g., an atomic subsystem) consisting of a set of state-less block(s) and a set of block(s) with state, where the parameters of interests are contained in the state-less block(s).

For a system equation of a continuous block whose derivative function may be (directly or indirectly) driven by a state-less block, the system equation may be rewritten as:

$$\dot{x} = f(x,y,t) \qquad \text{Eq. (19)}$$

where y=f(p, u) and p may be a constant parameter of the block while u may be the input of the block.

Then the parameter sensitivity of the derivative may be:

$$\frac{df}{dp} = \frac{\partial f}{\partial y}\frac{dy}{dp} = \frac{\partial f}{\partial y}\frac{\partial \phi(u, p)}{\partial p} \qquad \text{Eq. (20)}$$

A common case of block parameter Jacobian calculation may be for constant blocks and gain block. For the case of a constant block, the parameter of interest may be the constant value. Therefore:

$$\frac{\partial \phi}{\partial p} = 1 \qquad \text{Eq. (21)}$$

For a gain block where the gain is the parameter of interest, the parameter Jacobian of the block may be derived as $$\frac{\partial \phi}{\partial p} = u. \qquad \text{Eq. (22)}$$

where u is the input to the block.

For other blocks, the information about parameter Jacobians may be available for the blocks if the parameter is treated as an input into the blocks. The parameter may then be provided as a sub-matrix of the Jacobian matrix of the block.

Figure 19:
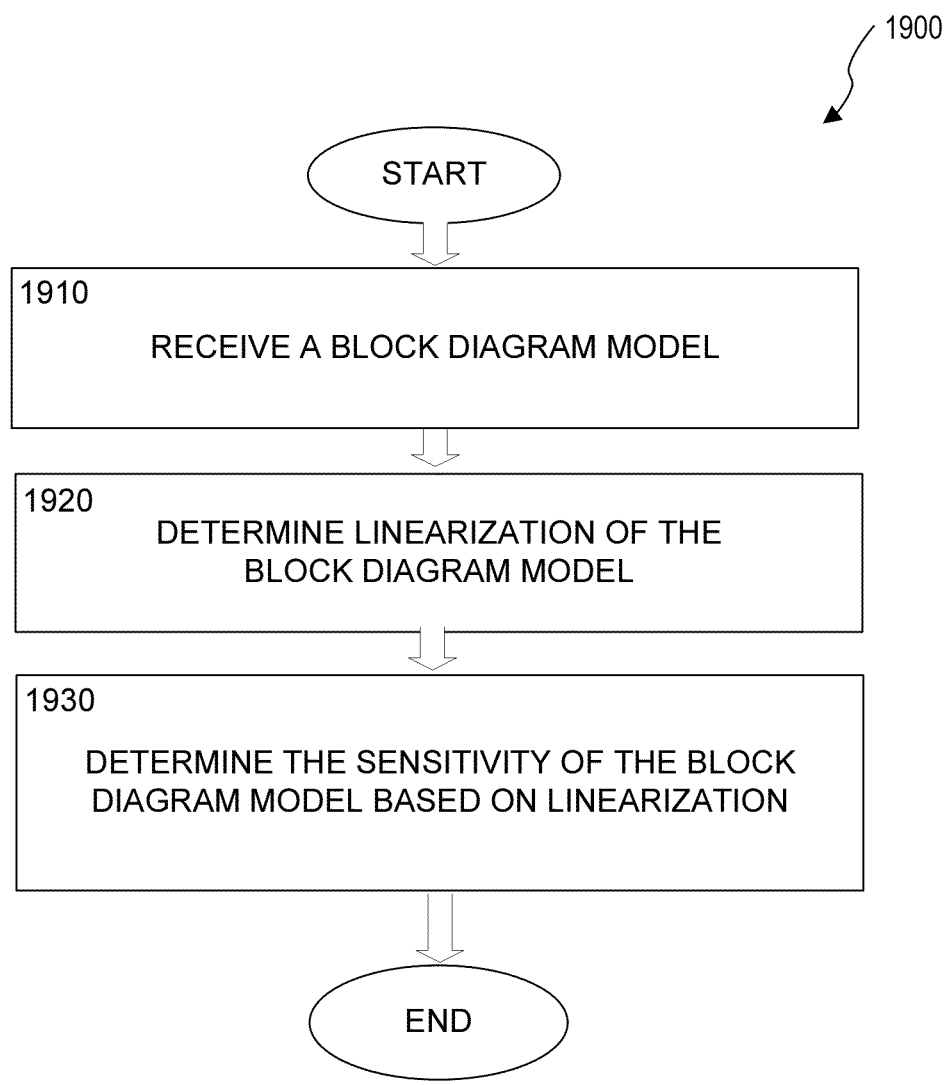
FIG. 19 illustrates exemplary processing for determining the sensitivity of a block diagram model based on linearization according to an illustrative embodiment.

FIG. 19 illustrates exemplary processing 1900 for determining the sensitivity of a model based on linearization according to an illustrative embodiment. Sensitivity analysis tool 130 may receive model 110 (act 1910).

Sensitivity analysis tool 130 may determine a linearization of model 110 (act 1920). Determination of the linearization of model 110 may be based on exemplary processing 800 for determining a closed-loop model Jacobian based on a reduced model Jacobian graph as described in FIG. 8.

Sensitivity analysis tool 130 may determine the sensitivity of model 110 based on the linearization of model 110 (act 1930). For example, sensitivity analysis tool 130 may determine the parameter sensitivity for a block and combine the parameter sensitivity of the block with a model Jacobian from the linearization of model 110 to determine the parameter sensitivity of model 110.

Exemplary Sensitivity Analysis Plots

Figure 20A:
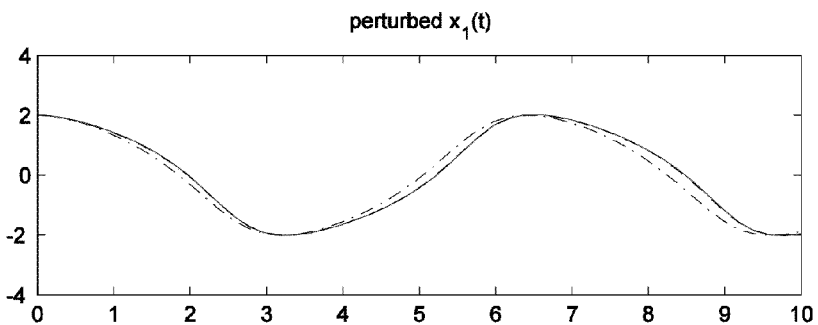
FIGS. 20A and 20B illustrate example perturbed plots based on the block diagram model in FIG. 2 according to an illustrative embodiment.
Figure 20B:
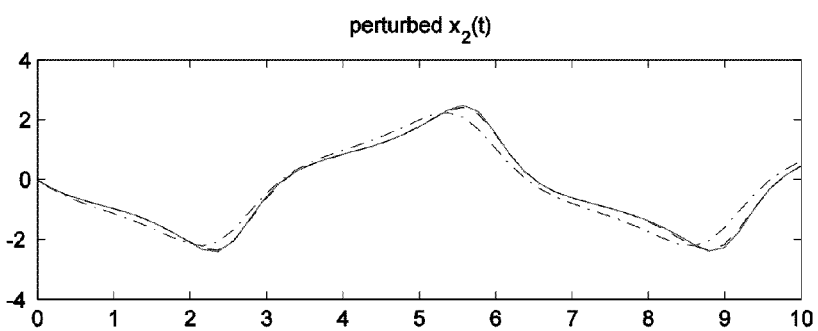

FIGS. 20A and 20B illustrate example perturbed plots 2000, 2050 based on the block diagram model in FIG. 2 according to an illustrative embodiment. The solid lines in plots 2000 and 2050 may present simulation results for a given parameter value. The dashed lines may represent approximated simulation results determined using sensitivity analysis for a +/−5% change in the given parameter value.

Figure 21:
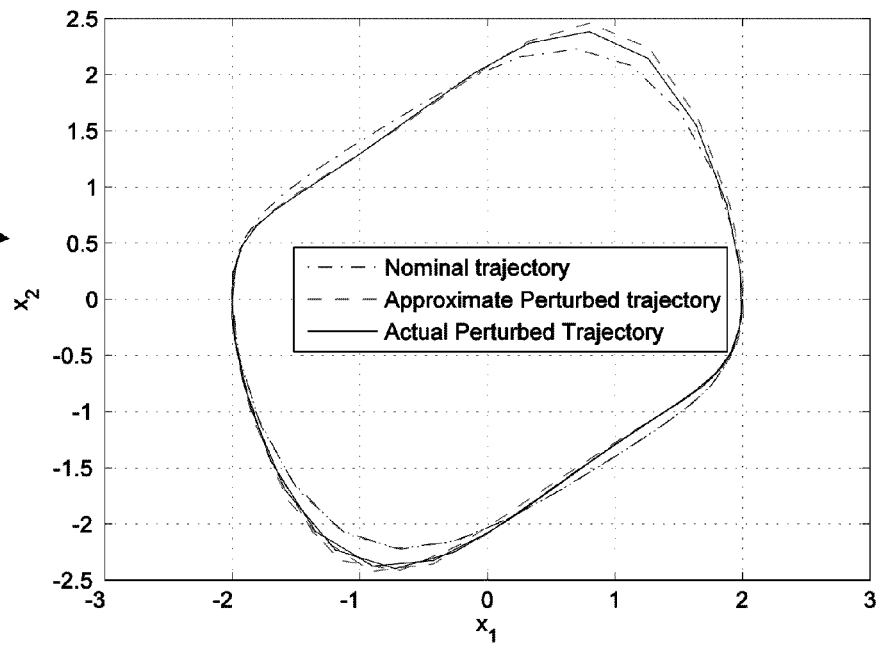
FIG. 21 illustrates an example phase plane portrait based on the block diagram model in FIG. 2 according to an illustrative embodiment.

FIG. 21 illustrates an example phase plane portrait 2100 based on the block diagram model in FIG. 2 according to an illustrative embodiment. The solid line in portrait 2100 shows the phase plane portrait for the simulation results for a given parameter value. The dashed line may represent the phase plane portrait of approximated simulation results determined using sensitivity analysis for a +/−5% change in the parameter value. The solid line shows the actual simulation result determined by repeating the simulation for a +/−5% change in the parameter value. The fact that the dashed line matches the solid line demonstrates that the sensitivity analysis gives an accurate approximation.

Further Exemplary Processing for Sensitivity Analysis

Sensitivity analysis may be used to account for special circumstances, such as initial conditions, zero-crossing events, etc.

Initial conditions may be viewed as a special case of constant parameters of the model. Therefore computing of initial condition sensitivity may follow the same routine.

Initial condition sensitivity may be described as:

$$\dot{x} = f(x, y, t) \qquad \text{Eq. (23)}$$

$$\frac{\dot{v}}{\partial x_0} = \frac{\partial f}{\partial x} \frac{\partial x}{\partial x_0}$$

where the sensitivity equation for initial conditions may be reduced to $$\dot{s} = J_x s \qquad \text{Eq. (24)}$$

Equation (24) may be a linear time-varying dynamic system with no inputs. In equation (24), $J_x$ may be the Jacobian matrix computed by an ODE solver when solving the original block diagram model 110 if the ODE solver has already computed the Jacobian matrix. $J_x$ may also be computed based on a linearization infrastructure using linearization tool 120.

A zero-crossing event may be an event in time where a signal crosses zero. A zero-crossing event may be used to model interaction between an embedded controller and a physical system, for example, an on-off switch governed by a threshold such as in an electronic thermostat. A zero-crossing event may also be used for model triggering events, such as signal measurement and detection in control systems (e.g., triggering events for a smoke detector).

In certain situations, there may not be any resets associated with the zero-crossing event, (i.e., the state of the system does not change during the zero-crossing event). When this occurs, sensitivity analysis with zero-crossing signals may follow a similar analysis path as disclosed in FIG. 19 for determining model sensitivity based on linearization.

Figure 22:
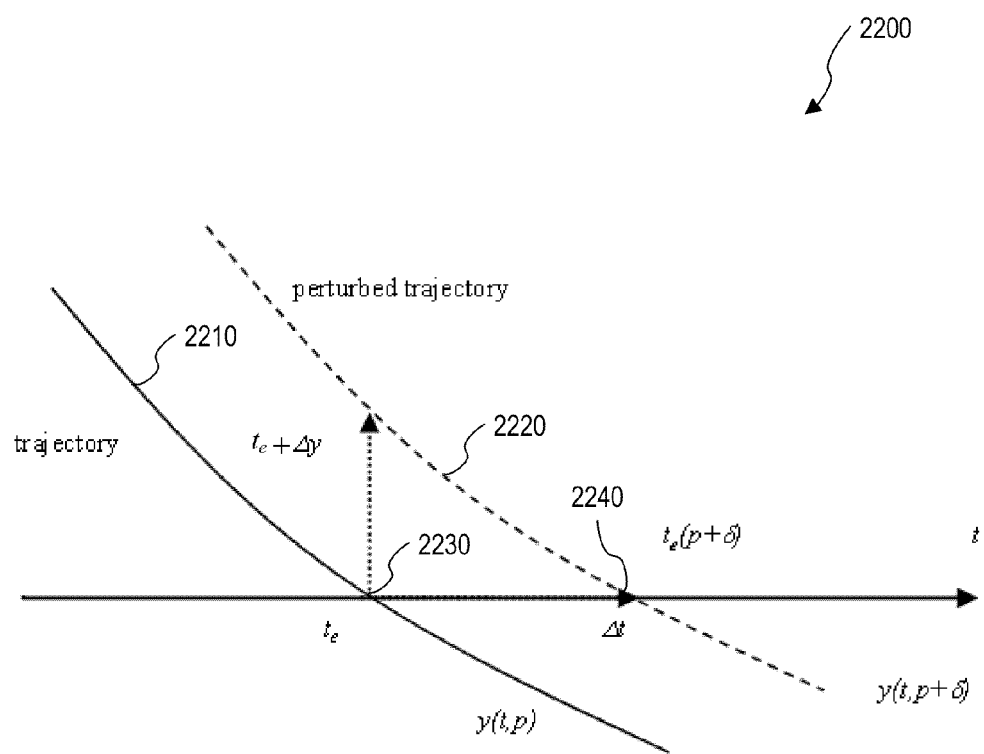
FIG. 22 illustrates an example plot of a zero-crossing signal according to an illustrative embodiment.

FIG. 22 illustrates an example plot 2200 of a zero-crossing signal according to an illustrative embodiment.

Consider a continuous system modeled by an ODE system:

$$\dot{x} = f(x, p, t) \qquad \text{Eq. (25)}$$

Suppose that the model has a time-invariant zero-crossing signal given by y=g(x). Let $t_e$ denote the time 2230 of the zero-crossing event, e.g., $g(x(t_e))=0$. Consider the behavior of the system under infinitesimal perturbation. The trajectory of zero-crossing signal y may be shown as solid curve 2210 in plot 2200. Dashed curve 2220 may represent a perturbed trajectory of zero-crossing signal y when a small perturbation in a parameter causes the trajectory to slightly shift. Slight shifts in signal y may cause the time of zero-crossing, $t_e$, to shift by $\Delta t$ from time 2230 to time 2240 so that:

$$y(t_e + \Delta t, p + \delta) = 0 \qquad \text{Eq. (26)}$$

Differentiating Eq. 26 with respect to t and p may provide:

$$\frac{\partial y}{\partial t_e} \Delta t + \frac{\partial y}{\partial p} \delta = 0 \qquad \text{Eq. (27)}$$

Accordingly, the sensitivity of the zero-crossing time with respect to the parameter may be:

$$\frac{\partial t_e}{\partial p} = -\frac{\partial g / \partial x \cdot s}{\partial g / \partial x \cdot f(x, p, t)} \qquad \text{Eq. (28)}$$

Determining the sensitivity may require computing the state derivative f, the state sensitivity s, and the Jacobian of the zero-crossing function g. The state derivative f and the state sensitivity s may be available from linearization. Similar to Jacobian matrix A, linearization tool 120 may also compute the Jacobian of the zero-crossing function analytically. Next, for the state after the zero-crossing, $x_e = x(t_e)$:

$$s_e = \frac{\partial x_e}{\partial p} = s + f(x, p, t) \frac{\partial t_e}{\partial p} \text{(reset state sensitivity)} \qquad \text{Eq. (29)}$$

The state sensitivity $s_e$ may be used as the initial state of the sensitivity variables for solving the sensitivity equation of the system for the system equation after the zero-crossing event. The state derivative used in equation (25) may refer to the left-hand side of the zero-crossing event, i.e., the calculation is all computed at $t_e^-$, the time immediately preceding a zero crossing event.

Figure 23:
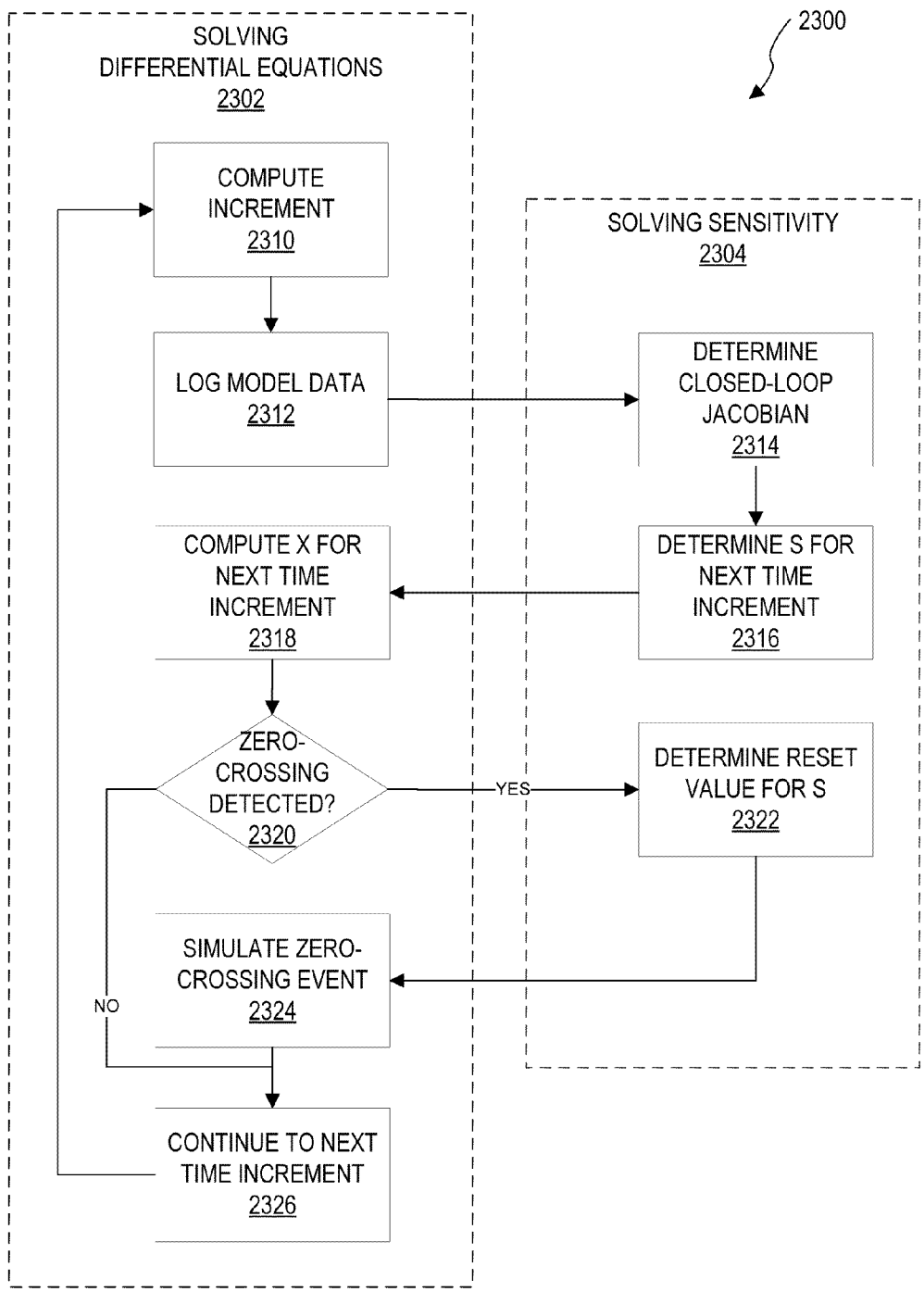
FIG. 23 illustrates exemplary processing for sensitivity analysis according to an illustrative embodiment.

FIG. 23 illustrates exemplary processing 2300 for performing sensitivity analysis according to an illustrative embodiment.

Processing 2300 may be split into two portions, namely solving differential equations 2302 and solving sensitivity 2304. Solving differential equations 2302 may be performed for executing model 110. Solving sensitivity 2304 may be used for performing sensitivity analysis, and may be based on a result from executing model 110. For example, sensitivity analysis tool 130 may perform sensitivity analysis based on the results from execution of model 110 by simulator 140 and a linearized model of model 110 from linearization tool 120.

Processing 2300 may perform sensitivity analysis for model 110 across several discrete time steps. Accordingly, simulator 140 may first compute an increment of model 110 (act 2310). For example, simulator 140 may calculate values for the variables in model 110 for a time increment (e.g., a model time step).

Simulator 140 may log model data (act 2312). For example, model data may include values for the variables and simulator 140 may log the model data using a data store.

Linearization tool 120 may determine a closed-loop Jacobian for model 110 (act 2314). Determining the closed-loop Jacobian may be based on exemplary processing 800 (FIG. 8) and may include using a reduced model Jacobian graph.

Sensitivity analysis tool 130 may determine sensitivity of model 110 for a next time step (act 2316). Sensitivity analysis tool 130 may determine sensitivity based on exemplary processing 1900 (FIG. 19) and may include linearizing the model when determining the sensitivity.

Simulator 140 may compute states of model 110 for a next time step (act 2318). The value of the state for the next time step may be computed by numerical integration (e.g., by adding the current time step times the value of the derivative of the state for the current time step to the value of the state for the current time step).

Simulator 140 may determine if a zero-crossing event has occurred (act 2320). Determination of a zero-crossing event may be based on determining if a signal, e.g., a value of a variable, has crossed the value of zero.

If simulator 140 detects a zero crossing event, sensitivity analysis tool 130 may determine a reset value for the sensitivity (act 2322). Simulator 140 may determine a reset value for sensitivity variables by simulating the behavior of the model at the zero crossing event (act 2324), such as the flipping of a switch or a triggering of a fire alarm.

Simulator 140 may cause processing to continue to a next time increment (act 2326) and processing may return to act 2310. If simulator 140 does not detect a zero crossing event, analysis tool 130 may continue to a next time increment without determining a reset value or simulating a zero-crossing event.

Figure 24:
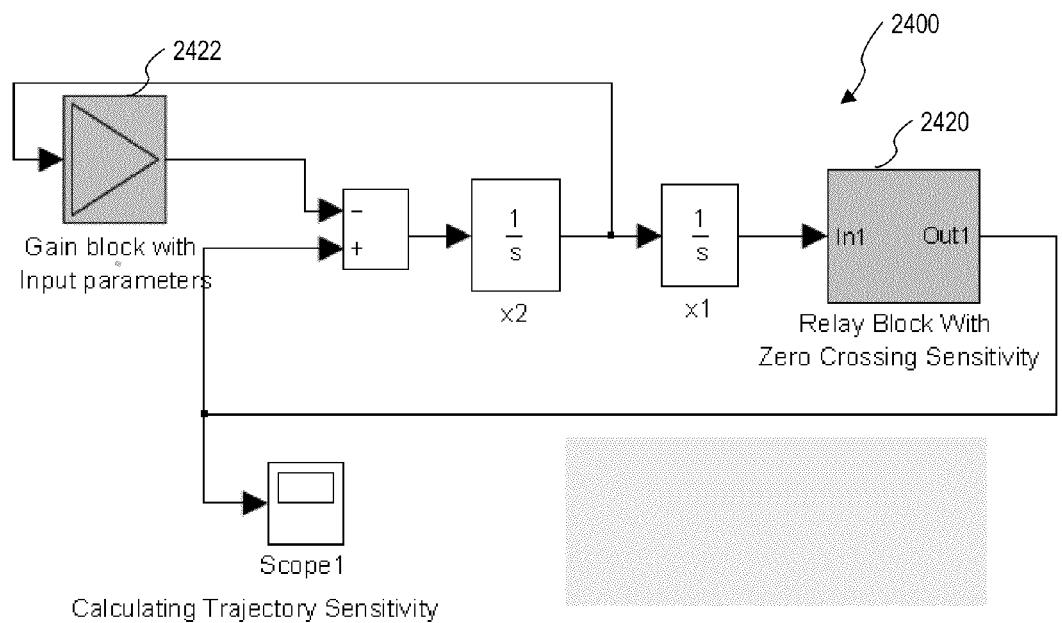
FIG. 24 illustrates an example block diagram model with zero-crossing sensitivity according to an illustrative embodiment.

FIG. 24 illustrates example model 2400 with zero-crossing sensitivity according to an illustrative embodiment. Model 2400 may include relay block with zero-crossing sensitivity 2420, gain block 2422, as well as other blocks. Relay block with zero-crossing sensitivity 2420 may possibly not be able to be directly analyzed, and may be replaced by a masked subsystem block that may be analyzed based on the components in the subsystem, as described below in regards to FIG. 25.

Figure 25:
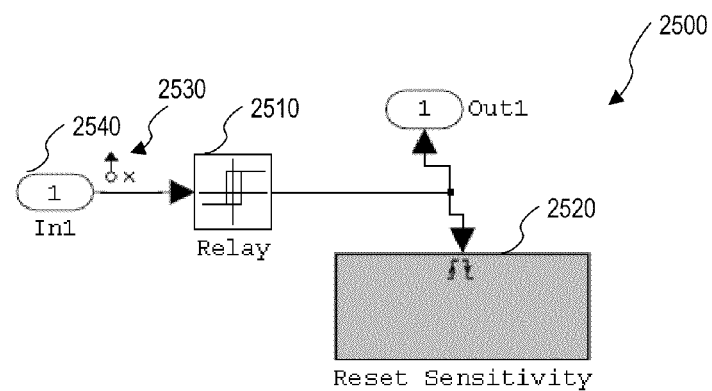
FIG. 25 illustrates an example block diagram with a relay block with zero-crossing sensitivity according to an illustrative embodiment.

FIG. 25 illustrates example model 2500 with a relay block with zero-crossing sensitivity according to an illustrative embodiment. Block diagram model 2500 may include relay block 2510, reset sensitivity triggered subsystem block 2520, linear analysis port 2530, and input port 2540. Block diagram model 2500 of masked relay subsystem may include relay block 2510, corresponding with relay block 2420, and triggered subsystem block 2520 to perform the computation of the sensitivity related to the zero-crossing event. Linear analysis port 2530 specified on input port 2540 may be used to facilitate the computation of a Jacobian of the zero-crossing signal.

Figure 27:
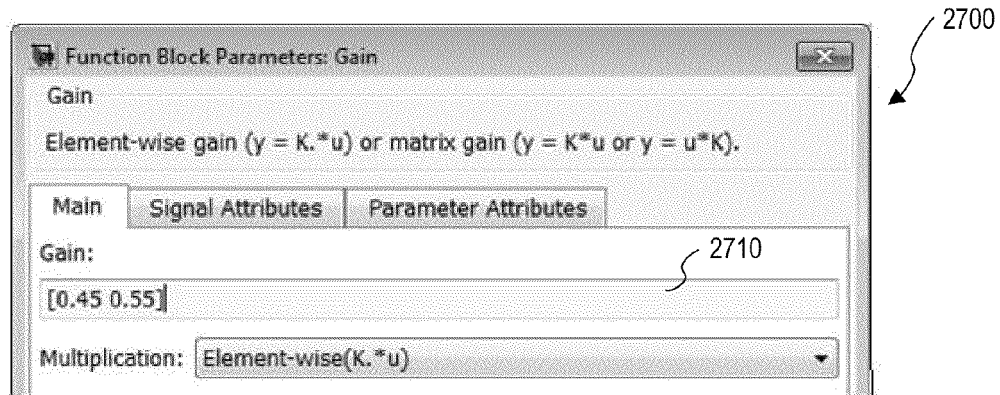
FIG. 27 illustrates an example user interface for receiving a request to perform sensitivity analysis from a user according to an illustrative embodiment.

FIGS. 26A and 26B illustrate exemplary plots of perturbed trajectories of block diagram model 2400 in FIG. 24 according to an illustrative embodiment. The solid lines in FIGS. 26A and 26B may show the trajectory of block diagram model 2400 for a given gain parameter value. The dotted lines in FIGS. 26A and 26B may show the computed perturbed trajectory of block diagram model 2400 using sensitivity analysis to estimate the trajectory for a +/−5% change in the gain parameter value. FIG. 27 illustrates an example user interface 2700 for receiving a request to perform sensitivity analysis from a user according to an illustrative embodiment. User interface 2700 may be a dialog box and may include text box 2710 for a user to provide information on a model parameter for performing parameter sensitivity. Information on the model parameter may be an uncertainty associated with the model parameter, a value of the model parameter, a range of the model parameter, a stochastic parameterization specifying the model parameter, etc. For example, user interface 2700 may allow a user to specify a range of gain values for a gain block in text box 2710. Analysis tool 130 may then perform sensitivity analysis based on the user specified information and display results of the sensitivity analysis to the user. Results may be displayed as any of the plots in FIG. 3A, 3B, 20A, 20B, 21, 26A or 26B.

Example Distributed System

Figure 28:
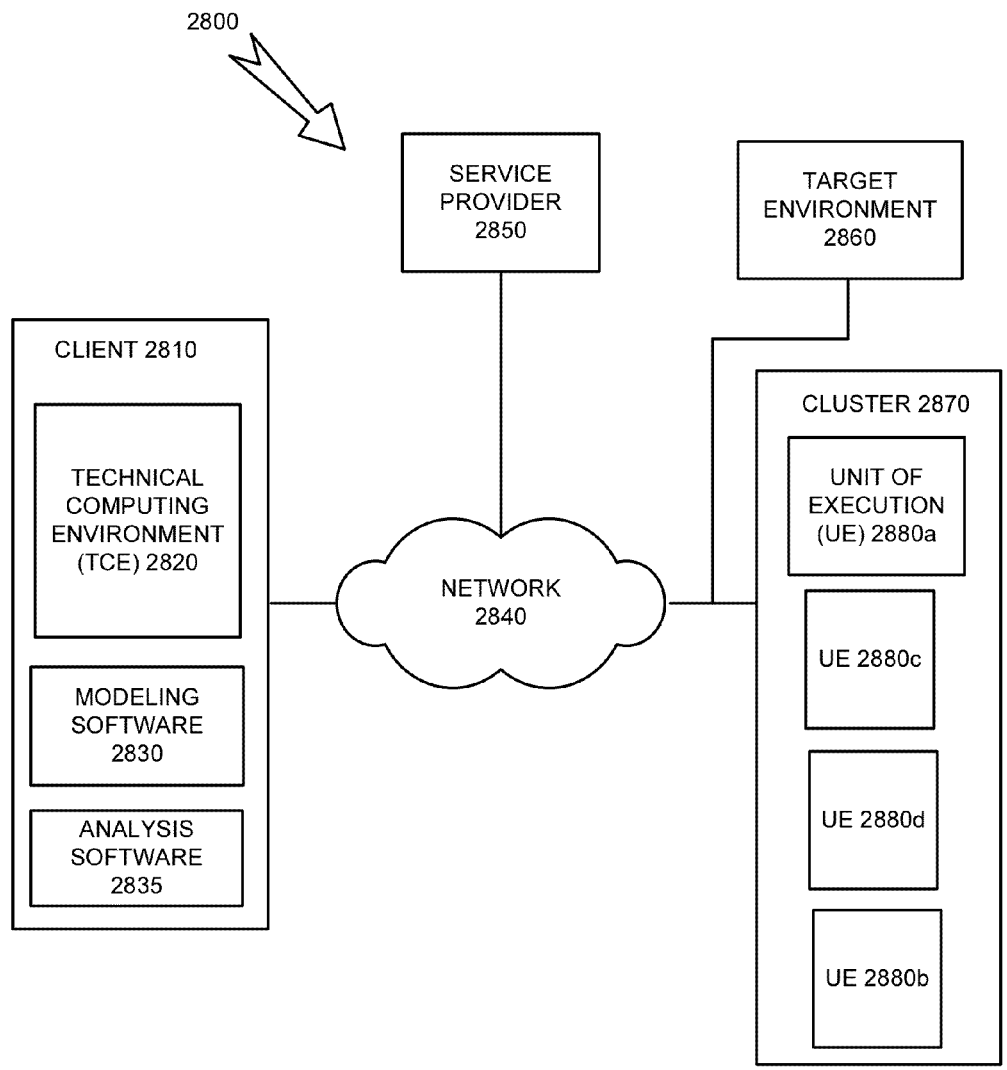
FIG. 28 illustrates a distributed environment that may be configured to practice an illustrative embodiment.

FIG. 28 illustrates distributed environment 2800 that may be configured to practice an illustrative embodiment. Referring to FIG. 28, environment 2800 may include a client 2810, network 2840, service provider 2850, target environment 2860 and cluster 2870. Note that the distributed environment illustrated in FIG. 28 is just one example of a distributed environment that may be used. Other distributed environments may include additional devices, fewer devices, or devices in arrangements that differ from the arrangement of environment 2800. For example, distributed environment 2800 may be implemented as a computing cloud.

Client 2810 may include a device capable of sending and/or receiving information (e.g., data) to and/or from another device, such as target environment 2860. Information may include any type of machine-readable information having substantially any format that may be adapted for use, e.g., in one or more networks and/or with one or more devices. The information may include digital information and/or analog information. The information may further be packetized and/or non-packetized. In an embodiment, client 2810 may download data and/or code via network 2840. For example, client 2810 can download code for suggesting correct identifiers consistent with aspects of the invention.

Client 2810 may be, for example, a desktop computer, a laptop computer, a client computer, a server computer, a mainframe computer, a personal digital assistant (PDA), a web-enabled cellular telephone, a smart phone, smart sensor/ actuator, or another computation or communication device that executes instructions that enable the device to perform one or more activities and/or generate one or more results.

In an illustrative embodiment, client 2810 may include a technical computing environment (TCE) 2820, modeling software 2830 and analysis software 2835. TCE 2820 may include a graphical block diagram environment that may be used to design models, execute models and manipulate the models in accordance with techniques described herein. TCE 2820 may be graphical-based TCE 100. In other illustrative embodiments, client 2810 may include other components, applications, etc. Illustrative embodiments of TCE 2820 may contain computer-executable instructions (e.g., code) and data that are configured to implement the TCE. The instructions may include instructions configured to implement modeling software 2830 and/or graphical analysis software 2835. An example embodiment of graphical-based TCE 100 may be implemented in a TCE 2820.

Modeling software 2830 and analysis software 2835 may be graphical, textual or a combination that includes both textual and graphical capabilities/features. Modeling software 2830 may include computer-executable instructions that allow, e.g., a user to build and/or execute a model. For example, modeling software 2830 may allow a user to build and execute a time-based model, a state-based model, an event-based model, a dataflow-based model, etc. Modeling software 2830 may include code generation logic which may include hardware and/or software for converting a model into a program or code in a computer programming language (e.g., C, C++, SystemC, etc.). In one example, a code generator may accept a model that is created in the core simulation logic and may generate a hardware description language (HDL). The generated code may be editable using an editor. An execution engine may be configured to compile and link the generated code to produce an "in-memory executable" version of model. The in-memory executable version of the model may be used, for example, to simulate, verify, trim, or linearize the model. An example embodiment of the invention may be implemented as part of modeling software 2830.

Analysis software 2835 may include computer-executable instructions that allow information in a model to be evaluated. Evaluating a model may include generating tests for the model that satisfy model coverage objectives (e.g., condition coverage, decision coverage, modified condition/decision coverage, etc.), user-defined objectives, etc. In addition, evaluating a model may include proving various model properties and generating examples of violations of these properties. Moreover, evaluating a model may include analyzing the model, in accordance with techniques described herein. In an illustrative embodiment, analysis software 2835 may include the Simulink® Design Verifier software which is available from The MathWorks, Inc. An example embodiment of the invention may be implemented as part of analysis software 2835. Analysis software 2835 may include software for executing the processes described in the flowcharts of FIGS. 4, 6, 7, 8, 19, and/or 23.

Network 2840 may include any network capable of exchanging information between entities associated with the network, including, for example, client 2810, service provider 2850, target environment 2860 and cluster 2870. Exchanged information may include, for example, packet data and/or non-packet data. Implementations of network 2840 may include local area networks (LANs), metropolitan area networks (MANs), wide-area networks (WANs), etc. Information may be exchanged between entities using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

Network 2840 may include various network devices, such as, for example, routers, switches, firewalls, servers, etc. Portions of network 2840 may be wired (e.g., using wired conductors, optical fibers, etc.) and/or wireless (e.g., free-space optical (FSO), radio frequency (RF), acoustic transmission paths, etc.). Portions of network 2840 may include a substantially open public network, such as the Internet. Portions of network 2840 may include a more restricted network, such as a virtual private network (VPN). It should be noted that implementations of networks and/or devices operating on networks described herein are not limited with regards to information carried by the networks, protocols used in the networks, the architecture/configuration of the networks, etc.

Service provider 2850 may include code (e.g., software), logic (e.g., hardware or a combination of hardware and software), etc., that makes a service available to another device in distributed environment 2800. Service provider 2850 may include a server operated by an entity (e.g., an individual, a corporation, an educational institution, a government agency, etc.) that provides one or more services to a destination, such as client 2810. The services may include software containing computer-executable instructions that may be executed, in whole or in part, by a destination, by service provider 2850 on behalf of the destination, or some combination thereof. An example embodiment of the invention may be implemented as part of service provider 2850.

Target environment 2860 may include a device that receives information from client 2810, service provider 2850, or cluster 2870. For example, target environment 2860 may receive executable code from client 2810, where the executable code allows target environment to perform an operation when the code is executed. Client 2810 may have generated the executable code using TCE 2820, modeling software 2830, and/or a code generator (not shown in FIG. 28).

Cluster 2870 may include a number of processing resources that perform processing on behalf of another device, such as client 2810, service provider 2850 and/or target environment 2860. Cluster 2870 may include logic that manages and/or coordinates the operation of multiple processing resources. For example, cluster 2870 may send data to and/or receive results from these processing resources. In an illustrative embodiment, cluster 2870 may include units of execution (UEs) 2880*a*, *b*, *c*, and *d* (collectively UEs 2880) that may perform processing on behalf of client 2810 and/or another device, such as service provider 2850. An example embodiment of the invention may be implemented on one or more UEs 2880.

UEs 2880 may include hardware, software, or hybrid logic that performs processing operations on behalf of TCE 2820. For example, in an illustrative embodiment UEs 2880 may parallel process portions of a graphical model created by user of client 2810. This parallel processing may include performing analysis on the model, parsing the model into portions, and/or aggregating results from respective UEs 2880 into a single result for display to a user at client 2810. UEs 2880 may reside on a single device or chip or on multiple devices or chips. For example, UEs 2880 may be implemented in a single application specific integrated circuit (ASIC) or in multiple ASICs. Likewise, UEs 2880 can be implemented in a single computer system using virtualization techniques. Other examples of UEs 2880 may include field programmable gate arrays (FPGAs), complex programmable logic devices (CPLDs), application specific instruction-set processors (ASICs), microprocessors, etc.

A TCE 2820 may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc.

In one implementation, the TCE 2820 may include a dynamically typed language that can be used to express problems and/or solutions in mathematical notations familiar to those of skill in the relevant arts. For example, the TCE 2820 may use an array as a basic element, where the array may not require dimensioning. These arrays may be used to support array programming in that operations can apply to an entire set of values, such as values in an array. Array programming may allow array based operations to be treated as a high-level programming technique or model that lets a programmer think and operate on whole aggregations of data without having to resort to explicit loops of individual non-array, i.e., scalar operations.

A TCE 2820 may further be adapted to perform matrix and/or vector formulations that can be used for data analysis, data visualization, application development, simulation, modeling, algorithm development, etc. These matrix and/or vector formulations may be used in many areas, such as statistics, finance, image processing, signal processing, control design, life sciences, education, discrete event analysis and/or design, state based analysis and/or design, etc.

A TCE 2820 may further provide mathematical functions and/or graphical tools (e.g., for creating plots, surfaces, images, volumetric representations, etc.). In one implementation, the TCE 2820 may provide these functions and/or tools using toolboxes (e.g., toolboxes for signal processing, image processing, data plotting, parallel processing, optimization, etc.). In another implementation, the TCE 2820 may provide these functions as block sets (e.g., an optimization block set). In still another implementation, the TCE 2820 may provide these functions in another way, such as via a library, etc. The TCE 2820 may be implemented as a text based environment, a graphically based environment, or another type of environment, such as a hybrid environment that is both text and graphically based.

Illustrative Computing Architecture Example System

Figure 29:
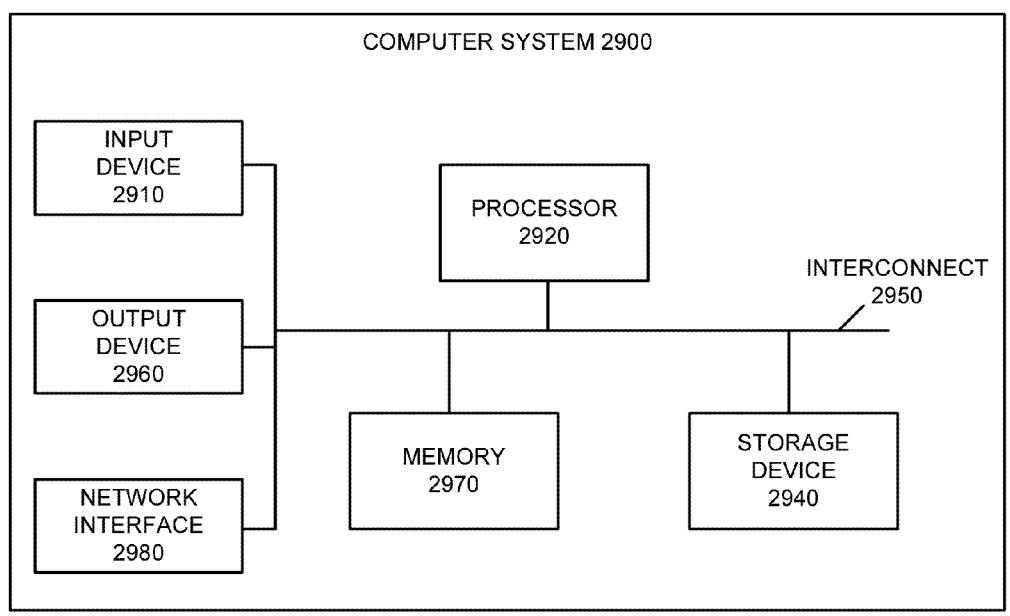
FIG. 29 illustrates an example of a computer system that may be configured to practice an illustrative embodiment.

FIG. 29 illustrates an example of a computer system 2900 that may be configured to practice an illustrative embodiment of the invention. For example, computer system 2900 may be used to implement client 2810, service provider 2850, target environment 2860, etc. Computer system 2900 may include processor 2920, memory 2970, storage device 2940, input device 2910, output device 2960, interconnect 2950 and network interface 2980. Processor 2920 may include logic configured to execute computer-executable instructions that implement illustrative embodiments of the invention. An example of a processor that may be used with the invention includes the Pentium processor available from Intel Corporation, Santa, Clara, Calif. The instructions may reside in memory 2970 and may include instructions associated with TCE 2820 or graphical-based TCE 100.

Memory 2970 may be a computer-readable medium that may be configured to store instructions configured to implement illustrative embodiments of the invention. Memory 2970 may be a primary storage accessible to processor 2920 and can include a random-access memory (RAM) that may include RAM devices, such as, for example, Dynamic RAM (DRAM) devices, flash memory devices, Static RAM (SRAM) devices, etc. Storage device 2940 may include a magnetic disk and/or optical disk and its corresponding drive for storing information and/or instructions.

Interconnect 2950 may include logic that operatively couples components of computer system 2900 together. For example, interconnect 2950 may allow components to communicate with each other, may provide power to components of computer system 2900, etc. In an illustrative embodiment of computer system 2900, interconnect 2950 may be implemented as a bus.

Input device 2910 may include logic configured to receive information for computer system 2900 from, e.g., a user. Illustrative embodiments of input device 2910 may include keyboards, cameras, touch sensitive areas (e.g., displays), multi-point input devices, biometric sensing devices, computer mice, trackpads, trackballs, pen-based point devices, etc. Output device 2960 may include logic configured to output information from computer system 2900. Illustrative embodiments of output device 2960 may include cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), etc. Interaction for the visualization may be based on receiving input from a user via input device 2910 and providing output to a user via output device 2960.

Network interface 2980 may include logic configured to interface computer system 2900 with a network, e.g., network 2840, and may enable computer system 2900 to exchange information with other entities connected to the network, such as, for example, service provider 2850, target environment 2860 and cluster 2870. Network interface 2980 may be implemented as a built-in network adapter, network interface card (NIC), Personal Computer Memory Card International Association (PCMCIA) network card, card bus network adapter, wireless network adapter, Universal Serial Bus (USB) network adapter, modem or any other device suitable for interfacing computer system 2900 to any type of network.

It should be noted that illustrative embodiments may be implemented using some combination of hardware and/or software. It should be further noted that a computer-readable medium that includes computer-executable instructions for execution in a processor may be configured to store illustrative embodiments of the invention. The computer-readable medium may include volatile memories, non-volatile memories, flash memories, removable discs, non-removable discs and so on. In addition, it should be noted that various electromagnetic signals such as wireless signals, electrical signals carried over a wire, optical signals carried over optical fiber and the like may be encoded to carry computer-executable instructions and/or computer data on e.g., a communication network for an illustrative embodiment of the invention.

A hardware unit of execution may include a device (e.g., a hardware resource) that performs and/or participates in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, in one implementation, a hardware unit of execution may include a single processing device that includes multiple cores, and in another implementation, the hardware unit of execution may include a number of processors 2920. A hardware unit of execution may also be a programmable device, such as a field programmable gate array (FPGA), an application specific integrated circuit (ASIC), a digital signal processor (DSP), etc. Devices used in a hardware unit of execution may be arranged in substantially any configuration (or topology), such as a grid, ring, star, etc. A hardware unit of execution may support one or more threads (or processes) when performing processing operations.

A software unit of execution may include a software resource (e.g., a technical computing environment [e.g., MATLAB® software], a worker, a lab, etc.) that performs and/or participates in parallel programming activities. For example, a software unit of execution may perform and/or participate in parallel programming activities in response to receipt of a program and/or one or more portions of the program. In an illustrative embodiment, a software unit of execution may perform and/or participate in substantially any type of parallel programming using one or more hardware units of execution. Illustrative embodiments of a software unit of execution may support one or more threads and/or processes when performing processing operations.

Alternative Illustrative Embodiments

An alternative illustrative embodiment may implement a TCE 2820 using one or more text-based products. For example, a text-based TCE 2820, may be implemented using products such as, but not limited to, MATLAB® programming language by The MathWorks, Inc.; Octave; Python; Comsol Script; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dassault Systemes.

Other illustrative embodiments may implement a TCE 2820 in a graphically-based TCE 2820 using products such as, but not limited to, Simulink®, Stateflow®, SimEvents™, etc., by The MathWorks, Inc.; VisSim by Visual Solutions; MATRIXx or LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from IBM; Ptolemy from the University of California at Berkeley; or aspects of a Unified Modeling Language (UML) or SysML environment.

Another alternative illustrative embodiment may be implemented in a hybrid TCE 2820 that combines features of a text-based and graphically-based TCE 2820. In one implementation, one TCE 2820 may operate on top of the other TCE 2820. For example, a text-based TCE 2820 (e.g., MATLAB®) may operate as a foundation and a graphically-based TCE 2820 (e.g., Simulink®) may operate on top of MATLAB® and may take advantage of text-based features (e.g., commands) to provide a user with a graphical user interface and graphical outputs (e.g., graphical displays for data, dashboards, etc.).

CONCLUSION

Implementations may provide devices and techniques that may be used for the graph theoretic linearization and sensitivity analysis.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 4, 6, 7, 8, 19, and/or FIG. 23, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 1, 28 and 29 depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

Headings and/or subheadings used herein are used to segment this patent application into portions to facilitate the readability of the application. These headings and/or subheadings are not intended to define or limit the scope of the invention disclosed and/or claimed in this patent application.

The scope of the invention is defined by the claims and their equivalents.

What is claimed is:

1. One or more tangible non-transitory computer-readable storage media storing instructions, the instructions comprising:
   one or more instructions that, when executed by one or more processors, cause the one or more processors to:
   receive a first block representing a first portion of a block diagram model and a second block representing a second portion of the block diagram model;
   determine a Jacobian of the first block and a Jacobian of the second block;
   determine a first graph based on the Jacobian of the first block;
   determine a second graph based on the Jacobian of the second block;
   determine a third graph based on connecting the first graph and the second graph;
   reduce, when a vertex of the third graph is an algebraic variable and a complexity of the vertex is less than a sum of incoming edges of the vertex and outgoing edges of the vertex, the third graph; and
   analyze the block diagram model based on the reduced third graph.

2. The one or more tangible non-transitory computer-readable storage media of claim 1, where the one or more instructions to determine the first graph based on the Jacobian of the first block include:
   one or more instructions that, when executed by the one or more processors, cause the one or more processors to:

determine, based on the Jacobian of the first block, a
Jacobian graph, the Jacobian graph including:
a directed graph,
the directed graph including two or more nodes and
one or more edges,
a function that assigns a real matrix to the one or
more edges of the directed graph, and
at least one of a set of state variables or a set of
algebraic variables.

3. The one or more tangible non-transitory computer-readable storage media of claim 1, where the one or more instructions to determine the third graph include:
one or more instructions that, when executed by the one or
more processors, cause the one or more processors to:
determine an open-loop Jacobian.

4. The one or more tangible non-transitory computer-readable storage media of claim 1, where the reduced third graph comprises a closed-loop Jacobian.

5. The one or more tangible non-transitory computer-readable storage media of claim 1, where the instructions further comprise:
one or more instructions that, when executed by the one or
more processors, cause the one or more processors to:
construct a set of linear system equations representing a
linearized model of a system represented by the first
portion of the block diagram model; and
where the one or more instructions to analyze the block
diagram model include:
one or more instructions that, when executed by the
one or more processors, cause the one or more
processors to:
analyze the block diagram model based on the set
of linear system equations.

6. The one or more tangible non-transitory computer-readable storage media of claim 5, where the one or more instructions to analyze the block diagram model include:
one or more instructions that, when executed by the one or
more processors, cause the one or more processors to:
determine a sensitivity of the block diagram model
based on the set of linear system equations.

7. The one or more tangible non-transitory computer-readable storage media of claim 6, where the one or more instructions to determine the sensitivity include:
one or more instructions that, when executed by the one or
more processors, cause the one or more processors to:
determine a sensitivity equation of the block diagram
model for a time step; and
integrate the sensitivity equation of the block diagram
model to a next time step.

8. The one or more tangible non-transitory computer-readable storage media of claim 6, where the sensitivity relates to an initial condition sensitivity of the block diagram model.

9. The one or more tangible non-transitory computer-readable storage media of claim 6, where the one or more instructions to analyze the block diagram model further include:
one or more instructions that, when executed by the one or
more processors, cause the one or more processors to:
determine an occurrence of a zero-crossing event; and
compute, based on the occurrence of the zero-crossing
event, a reset value for the sensitivity.

10. The one or more tangible non-transitory computer-readable storage media of claim 6, where the one or more instructions to analyze the block diagram model further include:
one or more instructions that, when executed by the one or
more processors, cause the one or more processors to:
perform a perturbation analysis based on the sensitivity
of the block diagram model.

11. The one or more tangible non-transitory computer-readable storage media of claim 1, where the block diagram model comprises at least one of a continuous model or a discrete model.

12. A method comprising:
obtaining a first model element of a graphical model and a
second model element of the graphical model,
obtaining the first model element and the second model
element being performed by a computing device;
determining a Jacobian of the first model element and a
Jacobian of the second model element,
determining the Jacobian of the first model element and the
Jacobian of the second model element being performed
by the computing device;
generating, based on the Jacobian of the first model element, a first graph, generating the first graph being performed by the computing device;
generating, based on the Jacobian of the second model
element, a second graph, generating the second graph
being performed by the computing device;
generating, based on connecting the first graph and the
second graph, a third graph;
generating the third graph being performed by the computing device;
reducing, when a vertex of the third graph is an algebraic
variable and a complexity of the vertex is less than a sum
of incoming edges of the vertex and outgoing edges of
the vertex, the third graph, and
reducing the third graph being performed by the computing
device; and
analyzing, based on the third graph, the graphical model,
analyzing the graphical model being performed by the
computing device.

13. The method of claim 12, further comprising:
causing an execution of the graphical model;
linearizing, during the execution of the graphical model,
the graphical model into a linearized graphical model;
and
determining, during the execution of the graphical model,
a sensitivity of the graphical model based on the linearized graphical model.

14. The method of claim 13, further comprising:
providing information relating to the sensitivity to for display to a user.

15. The method of claim 13, further comprising:
receiving information identifying a model parameter; and
where determining the sensitivity of the graphical model
includes:
determining the sensitivity of the graphical model based
on the model parameter.

16. The method of claim 15, where receiving the information includes:
receiving at least one of:
information identifying an uncertainty of a variable in
the model parameter;
information identifying a value of the model parameter;
information identifying a range of the model parameter;
or
information identifying a stochastic parameterization
specifying the model parameter.

17. A device comprising:
one or more processors to:
obtain a first block of a block diagram model and a
second block of the block diagram model;

determine a Jacobian of the first block and a Jacobian of the second block;

determine a first graph based on the Jacobian of the first block;

determine a second graph based on the Jacobian of the second block;

determine a third graph based on the first graph and the second graph;

reduce, when a vertex of the third graph is an algebraic variable and a complexity of the vertex is less than a sum of incoming edges of the vertex and outgoing edges of the vertex, the third graph; and analyze the block diagram model based on the reduced third graph.

18. The device of claim 17, where, when analyzing the block diagram model, the one or more processors are to:

determine a sensitivity associated with the block diagram model based on the reduced third graph.

19. The device of claim 18, where, when determining the sensitivity, the one or more processors are further to:

determine the sensitivity during an execution of the block diagram model.

20. A system comprising:

one or more computing devices to:

obtain a graphical model, the graphical model including a first element and a second element;

determine a Jacobian of the first element and a Jacobian of the second element;

generate a first graph based on the Jacobian of the first element;

generate a second graph based on the Jacobian of the second element;

generate a third graph based on the first graph and the second graph;

reduce, when a vertex of the third graph is an algebraic variable and a complexity of the vertex is less than a sum of incoming edges of the vertex and outgoing edges of the vertex, the third graph; and analyze the graphical model based on the reduced third graph.

21. The system of claim 20, where the one or more devices are further to:

construct a set of linear system equations; and where, when analyzing the graphical model, the one or more devices are to:

analyze the graphical model based on the set of linear system equations.

22. The device of claim 21, where, when analyzing the block diagram model, the one or more devices are further to:

determine a sensitivity associated with the block diagram model based on the set of linear system equations.

23. The system of claim 22, where, when analyzing the block diagram model, the one or more devices are further to:

determine an occurrence of a zero-crossing event; and compute, based on the occurrence of the zero-crossing event, a reset value for the sensitivity.

* * * * *